United States Patent
Khoshnevisan et al.

(10) Patent No.: US 11,659,560 B2
(45) Date of Patent: May 23, 2023

(54) GROUP-BASED ACKNOWLEDGMENT FEEDBACK FOR WIRELESS COMMUNICATIONS IN THE PRESENCE OF SEMI-PERSISTENT SCHEDULING

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/027,337

(22) Filed: Sep. 21, 2020

(65) Prior Publication Data

US 2021/0099980 A1 Apr. 1, 2021

(30) Foreign Application Priority Data

Sep. 30, 2019 (IN) .............................. 201941039480

(51) Int. Cl.
*H04W 72/04* (2023.01)
*H04L 5/00* (2006.01)
(Continued)

(52) U.S. Cl.
CPC ............. *H04W 72/042* (2013.01); *H04L 1/08* (2013.01); *H04L 5/0055* (2013.01); *H04W 72/0466* (2013.01)

(58) Field of Classification Search
CPC .. H04W 72/042; H04W 72/0466; H04L 1/08; H04L 5/0055; H04L 5/001; H04L 1/1864; H04L 1/1861; H04L 5/0094
See application file for complete search history.

(56) References Cited

U.S. PATENT DOCUMENTS

2018/0302128 A1 10/2018 Akkarakaran et al.
2019/0028242 A1* 1/2019 Xiao ..................... H04L 1/1607
(Continued)

FOREIGN PATENT DOCUMENTS

| CN | 110034902 A | 7/2019 |
| WO | WO-2011040771 A2 | 4/2011 |
| WO | WO-2019160483 A1 | 8/2019 |

OTHER PUBLICATIONS

International Search Report and Written Opinion—PCT/US2020/052044—ISA/EPO—dated Dec. 11, 2020 (195438WO).

*Primary Examiner* — Hoang-Chuong Q Vu
(74) *Attorney, Agent, or Firm* — QUALCOMM Incorporated

(57) ABSTRACT

Methods, systems, and devices for wireless communications are described that facilitate feedback for transmissions or retransmissions, such as hybrid automatic repeat request (HARQ) acknowledgment/negative-acknowledgment (ACK/NACK) feedback reports. A UE may report feedback for regular downlink transmission and semi-persistent scheduling (SPS) transmissions in one or more group-based acknowledgment feedback reports, in which SPS transmissions are associated with a group for providing the feedback report and any retransmissions of the feedback report. Acknowledgment feedback reports may also indicate new data indicator values according to a predetermined value for SPS transmissions in one-shot feedback reports.

16 Claims, 20 Drawing Sheets

(51) Int. Cl.
*H04L 1/08* (2006.01)
*H04W 72/044* (2023.01)

(56) References Cited

U.S. PATENT DOCUMENTS

| | | | |
|---|---|---|---|
| 2019/0103943 A1* | 4/2019 | Wang | H04L 1/1854 |
| 2020/0106569 A1* | 4/2020 | Tsai | H04L 5/0055 |
| 2020/0213044 A1* | 7/2020 | Peng | H04L 1/1819 |
| 2020/0228248 A1* | 7/2020 | Islam | H04L 1/1861 |
| 2020/0295882 A1* | 9/2020 | Wang | H04L 1/1812 |
| 2020/0351026 A1* | 11/2020 | Babaei | H04L 1/1835 |
| 2021/0050961 A1* | 2/2021 | Chen Larsson | H04W 72/0466 |
| 2021/0159948 A1* | 5/2021 | Li | H04W 72/1289 |
| 2021/0160839 A1* | 5/2021 | Ma | H04L 5/0055 |
| 2021/0250130 A1* | 8/2021 | Lei | H04L 1/1816 |
| 2022/0014314 A1* | 1/2022 | Wang | H04L 5/0053 |
| 2022/0052796 A1* | 2/2022 | Wu | H04L 1/1819 |
| 2022/0053533 A1* | 2/2022 | Lin | H04L 5/0053 |
| 2022/0174693 A1* | 6/2022 | Takeda | H04W 72/1278 |
| 2022/0294573 A1* | 9/2022 | Lei | H04L 1/1621 |
| 2022/0330297 A1* | 10/2022 | Lei | H04L 1/08 |

* cited by examiner

GROUP-BASED ACKNOWLEDGMENT FEEDBACK FOR WIRELESS COMMUNICATIONS IN THE PRESENCE OF SEMI-PERSISTENT SCHEDULING

CROSS REFERENCE

The present application for patent claims the benefit of Indian Provisional Patent Application No. 201941039480 by KHOSHNEVISAN et al., entitled "GROUP-BASED ACKNOWLEDGMENT FEEDBACK FOR WIRELESS COMMUNICATIONS IN THE PRESENCE OF SEMI-PERSISTENT SCHEDULING," filed Sep. 30, 2019, assigned to the assignee hereof, and expressly incorporated by reference herein.

BACKGROUND

The following relates generally to wireless communications, and more specifically to group-based acknowledgment feedback for wireless communications in the presence of semi-persistent scheduling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support acknowledgment feedback (e.g., hybrid acknowledgment repeat request (HARQ) feedback) to indicate if a wireless device (e.g., a UE) successfully decodes downlink messages (i.e., data transmissions) where the downlink message decoding is based on one or more detected downlink control messages (e.g., a downlink grant or downlink control information (DCI)). The acknowledgment feedback may be provided in an acknowledgment feedback report, and in some cases the acknowledgment report may include acknowledgment feedback for two or more groups of transmissions in a group-based acknowledgment configuration. Further, in some cases a wireless device (e.g., a UE) may be configured with a semi-persistent scheduling (SPS) configuration in which multiple transmissions may be transmitted according to a periodic pattern. Techniques to enhance system performance for acknowledgment feedback are desirable.

SUMMARY

The described techniques relate to improved methods, systems, devices, and apparatuses that support group-based acknowledgment feedback for wireless communications in the presence of semi-persistent scheduling (SPS). In various aspects, a user equipment (UE) may be configured with a SPS configuration that provides resources for a number of downlink SPS transmissions to the UE. The SPS configuration may be activated (e.g., by an activation downlink control information (DCI) transmission), and periodic SPS transmissions along with regular downlink transmission (i.e., non-SPS transmissions) may be transmitted to the UE. In some cases, the regular downlink transmissions may be group-based transmissions in which each transmission is associated with a transmission group, and acknowledgment feedback (e.g., hybrid acknowledgment repeat request (HARQ) acknowledgment/negative-acknowledgment (ACK/NACK) feedback) may be provided on a group basis by the UE. In some cases, acknowledgement feedback for SPS transmissions may be provided along with the group-based acknowledgment feedback, and a group that is associated with the SPS feedback may be determined based on the SPS configuration, a DCI that activates the SPS, or a group of a regular downlink transmission received before or after the SPS transmission. Feedback for SPS transmissions may be provided with retransmissions of acknowledgment feedback, and may be appended or multiplexed with acknowledgment feedback for regular downlink transmissions.

In some cases, the UE may receive another DCI that releases the SPS activation, and the UE may provide acknowledgment feedback for such a DCI. In some cases, such acknowledgment feedback may be associated with a group that is indicated in the DCI that releases the SPS, or may be configured as part of the SPS configuration. The UE in such cases may provide a retransmission of the SPS release DCI with a corresponding retransmission of feedback for the associated group.

Additionally or alternatively, the UE may be configured for one-shot acknowledgment feedback, in which acknowledgment feedback for each configured HARQ process ID may be transmitted in response to a one-shot HARQ trigger. In some cases, such acknowledgment feedback may include an ACK/NACK bit associated with each HARQ process ID and an associated new data indicator (NDI) value that resolves ambiguity related to whether the ACK/NACK bit is associated with a latest transmission associated with the corresponding HARQ process ID. In some cases, when one-shot acknowledgment feedback includes acknowledgment feedback for SPS transmissions, a predetermined value (e.g., NDI=1) may be provided for the NDI reported with an initial SPS transmission or when a DCI indicates a retransmission of SPS acknowledgment feedback is requested. Further, a base station may use a predetermined NDI value (e.g., NDI=0) the first time a DCI is sent that requests an initial or retransmission of a same HARQ process ID.

A method of wireless communications is described. The method may include receiving, from a base station, a group-based acknowledgment feedback configuration for at least a first group of downlink transmissions to the UE, receiving, from the base station, at least a first semi-persistent scheduling configuration that indicates resources for a set of downlink semi-persistent scheduling transmissions to the UE, determining, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions, and transmitting the first group-based feedback indication and the first acknowledgment feedback indication in a first feedback communication to the base station.

An apparatus for wireless communications is described. The apparatus may include a processor, memory coupled with the processor, and instructions stored in the memory. The instructions may be executable by the processor to cause the apparatus to receive, from a base station, a group-based acknowledgment feedback configuration for at least a first group of downlink transmissions to the UE, receive, from the base station, at least a first semi-persistent scheduling configuration that indicates resources for a set of downlink semi-persistent scheduling transmissions to the UE, determine, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions, and transmit the first group-based feedback indication and the first acknowledgment feedback indication in a first feedback communication to the base station.

Another apparatus for wireless communications is described. The apparatus may include means for receiving, from a base station, a group-based acknowledgment feedback configuration for at least a first group of downlink transmissions to the UE, receiving, from the base station, at least a first semi-persistent scheduling configuration that indicates resources for a set of downlink semi-persistent scheduling transmissions to the UE, determining, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions, and transmitting the first group-based feedback indication and the first acknowledgment feedback indication in a first feedback communication to the base station.

A non-transitory computer-readable medium storing code for wireless communications is described. The code may include instructions executable by a processor to receive, from a base station, a group-based acknowledgment feedback configuration for at least a first group of downlink transmissions to the UE, receive, from the base station, at least a first semi-persistent scheduling configuration that indicates resources for a set of downlink semi-persistent scheduling transmissions to the UE, determine, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions, and transmit the first group-based feedback indication and the first acknowledgment feedback indication in a first feedback communication to the base station.

Some examples of the method, apparatuses, and non-transitory computer-readable medium described herein may further include operations, features, means, or instructions for receiving, from the base station, a downlink control information communication that activates the first semi-persistent scheduling configuration, and where the determining is further based on a group indication provided in the downlink control information communication. In some examples of the method, apparatuses, and non-transitory computer-readable medium described herein, the first semi-persistent scheduling configuration further includes a group indication that associated acknowledgment feedback is to be transmitted with the first group-based feedback indication. In some examples of the method, apparatuses, and non-transitory computer-readable medium described herein, each of the set of downlink semi-persistent scheduling transmissions to the UE according to the first semi-persistent scheduling configuration are associated with a same group-based acknowledgment feedback configuration.

Some examples of the method, apparatuses, and non-transitory computer-readable medium described herein may further include operations, features, means, or instructions for receiving, from the base station, a downlink control information communication that schedules a physical downlink shared channel transmission of the first group of downlink transmissions, and where the determining is further based on a group indication provided in the downlink control information communication. In some examples of the method, apparatuses, and non-transitory computer-readable medium described herein, the downlink control information communication is a latest downlink control information communication received prior to the first downlink semi-persistent scheduling transmission or a next subsequent downlink control information communication received after the first downlink semi-persistent scheduling transmission. In some examples of the method, apparatuses, and non-transitory computer-readable medium described herein, the determining may be further based on a group indication of a regular physical downlink transmission received prior to or after the first downlink semi-persistent scheduling transmission. In some examples of the method, apparatuses, and non-transitory computer-readable medium described herein, a default transmission group may be used for the first acknowledgment feedback indication for the first downlink semi-persistent scheduling transmission when the regular physical downlink transmission received is not associated with the same feedback timing as the first downlink semi-persistent scheduling transmission.

Some examples of the method, apparatuses, and non-transitory computer-readable medium described herein may further include operations, features, means, or instructions for receiving a request to retransmit the first group-based feedback indication from the base station, and retransmitting the first group-based feedback indication and the first acknowledgment feedback indication in a second feedback communication to the base station. In some examples of the method, apparatuses, and non-transitory computer-readable medium described herein, the request to retransmit is determined by the UE based on a reset indicator value (e.g., a NFI) remaining unchanged from a prior downlink control information transmission associated with the first group-based feedback indication, and where the retransmitting includes one or more additional feedback indications associated with one or more additional transmissions of the first group of downlink transmissions or the semi-persistent scheduling transmissions.

In some examples of the method, apparatuses, and non-transitory computer-readable medium described herein, the second feedback communication further includes feedback information for at least a second acknowledgment feedback indication for a second downlink semi-persistent scheduling transmission that is received subsequent to the first downlink semi-persistent scheduling transmission.

In some examples of the method, apparatuses, and non-transitory computer-readable medium described herein, the first acknowledgment feedback indication and the second acknowledgment feedback indication are appended feedback to a feedback codebook of the first group-based feedback indication. In some examples of the method, apparatuses, and non-transitory computer-readable medium described herein, the first acknowledgment feedback indication and the second acknowledgment feedback indication are ordered in the appended feedback according to an order of reception of the first downlink semi-persistent scheduling transmission and the second downlink semi-persistent scheduling transmission. In some examples of the method, apparatuses, and non-transitory computer-readable medium described herein, the first acknowledgment feedback indication and the second acknowledgment feedback indication are ordered in the appended feedback according to hybrid acknowledgment repeat request (HARQ) process identification values associated with each of the first downlink semi-persistent scheduling transmission and the second downlink semi-persistent scheduling transmission. In some examples of the method, apparatuses, and non-transitory computer-readable medium described herein, the second acknowledgment feedback indication may be appended to an end of the first group-based feedback indication and the first acknowledgment feedback indication.

In some examples of the method, apparatuses, and non-transitory computer-readable medium described herein, the first feedback communication to the base station includes feedback information for two or more downlink transmission groups, and where the first acknowledgment feedback indication is included with the feedback information for the two or more downlink transmission groups. In some examples of the method, apparatuses, and non-transitory computer-readable medium described herein, the first acknowledgment feedback indication is appended to the first group-based feedback indication. In some examples of the method, apparatuses, and non-transitory computer-readable medium described herein, the first acknowledgment feedback indication is appended to the feedback information for two or more downlink transmission groups.

A method of wireless communication at a UE is described. The method may include receiving, from a base station, a group-based acknowledgment feedback configuration for at least a first group of downlink transmissions to the UE, receiving, from the base station, at least a first semi-persistent scheduling configuration that indicates resources for a set of downlink semi-persistent scheduling transmissions to the UE, determining at least a first acknowledgment feedback indication for a first downlink semi-persistent scheduling transmission and a first group-based feedback codebook of the first group of downlink transmissions, and transmitting the first acknowledgment feedback indication to the base station independently of the first group-based feedback codebook.

An apparatus for wireless communication at a UE is described. The apparatus may include a processor, memory coupled with the processor, and instructions stored in the memory. The instructions may be executable by the processor to cause the apparatus to receive, from a base station, a group-based acknowledgment feedback configuration for at least a first group of downlink transmissions to the UE, receive, from the base station, at least a first semi-persistent scheduling configuration that indicates resources for a set of downlink semi-persistent scheduling transmissions to the UE, determine at least a first acknowledgment feedback indication for a first downlink semi-persistent scheduling transmission and a first group-based feedback codebook of the first group of downlink transmissions, and transmit the first acknowledgment feedback indication to the base station independently of the first group-based feedback codebook.

Another apparatus for wireless communication at a UE is described. The apparatus may include means for receiving, from a base station, a group-based acknowledgment feedback configuration for at least a first group of downlink transmissions to the UE, receiving, from the base station, at least a first semi-persistent scheduling configuration that indicates resources for a set of downlink semi-persistent scheduling transmissions to the UE, determining at least a first acknowledgment feedback indication for a first downlink semi-persistent scheduling transmission and a first group-based feedback codebook of the first group of downlink transmissions, and transmitting the first acknowledgment feedback indication to the base station independently of the first group-based feedback codebook.

A non-transitory computer-readable medium storing code for wireless communication at a UE is described. The code may include instructions executable by a processor to receive, from a base station, a group-based acknowledgment feedback configuration for at least a first group of downlink transmissions to the UE, receive, from the base station, at least a first semi-persistent scheduling configuration that indicates resources for a set of downlink semi-persistent scheduling transmissions to the UE, determine at least a first acknowledgment feedback indication for a first downlink semi-persistent scheduling transmission and a first group-based feedback codebook of the first group of downlink transmissions, and transmit the first acknowledgment feedback indication to the base station independently of the first group-based feedback codebook.

Some examples of the method, apparatuses, and non-transitory computer-readable medium described herein may further include operations, features, means, or instructions for receiving, from the base station, a request for a retransmission of the first group-based feedback codebook, and where a retransmission of the first acknowledgment feedback indication for the first downlink semi-persistent scheduling transmission is unable to be requested. Some examples of the method, apparatuses, and non-transitory computer-readable medium described herein may further include operations, features, means, or instructions for transmitting, responsive to the request for the retransmission, a retransmission of the first group-based feedback codebook to the base station, and where the first acknowledgment feedback indication is not included in the retransmission.

A method of wireless communication at a UE is described. The method may include receiving, from a base station, a group-based acknowledgment feedback configuration for at least a first group of downlink transmissions to the UE, receiving, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determining, based on one or more of the group-based acknowledgment feedback configuration or the downlink control information communication, that at least a first acknowledgment feedback indication for the downlink control information communication is to be included with a first group-based feedback indication of the first group of downlink transmissions, and transmitting the first group-based feedback indication and the first acknowledgment feedback indication in a first feedback communication to the base station.

An apparatus for wireless communication at a UE is described. The apparatus may include a processor, memory coupled with the processor, and instructions stored in the memory. The instructions may be executable by the processor to cause the apparatus to receive, from a base station, a group-based acknowledgment feedback configuration for at least a first group of downlink transmissions to the UE, receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determine, based on one or more of the group-based acknowledgment feedback configuration or the downlink control information communication, that at least a first acknowledgment feedback indication for the downlink control information communication is to be included with a first group-based feedback indication of the first group of downlink transmissions, and transmit the first group-based feedback indication and the first acknowledgment feedback indication in a first feedback communication to the base station.

Another apparatus for wireless communication at a UE is described. The apparatus may include means for receiving, from a base station, a group-based acknowledgment feedback configuration for at least a first group of downlink transmissions to the UE, receiving, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determining, based on one or more of the group-based acknowledgment feedback configuration or the downlink control information communication, that at least a first acknowledgment feedback indication for the downlink control information communication is to be included with a first group-based feedback indication of the first group of downlink transmissions, and transmitting the first group-based feedback indication and the first acknowledgment feedback indication in a first feedback communication to the base station.

A non-transitory computer-readable medium storing code for wireless communication at a UE is described. The code may include instructions executable by a processor to receive, from a base station, a group-based acknowledgment feedback configuration for at least a first group of downlink transmissions to the UE, receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determine, based on one or more of the group-based acknowledgment feedback configuration or the downlink control information communication, that at least a first acknowledgment feedback indication for the downlink control information communication is to be included with a first group-based feedback indication of the first group of downlink transmissions, and transmit the first group-based feedback indication and the first acknowledgment feedback indication in a first feedback communication to the base station.

In some examples of the method, apparatuses, and non-transitory computer-readable medium described herein, the downlink control information communication indicates that the first acknowledgment feedback indication is to be provided with group-based feedback of the first group of downlink transmissions. In some examples of the method, apparatuses, and non-transitory computer-readable medium described herein, the first semi-persistent scheduling configuration indicates that the first acknowledgment feedback indication is to be provided with group-based feedback of the first group of downlink transmissions. In some examples of the method, apparatuses, and non-transitory computer-readable medium described herein, the downlink control information communication further includes a downlink assignment index value that indicates that the first acknowledgment feedback indication is to be provided in a same uplink transmission as the first group-based feedback indication.

A method of wireless communication at a UE is described. The method may include receiving, from a base station, a group-based acknowledgment feedback configuration for at least a first group of downlink transmissions to the UE, receiving, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determining at least a first acknowledgment feedback indication for the downlink control information communication and a first group-based feedback codebook of the first group of downlink transmissions, and transmitting the first acknowledgment feedback indication to the base station independently of the first group-based feedback codebook.

An apparatus for wireless communication at a UE is described. The apparatus may include a processor, memory coupled with the processor, and instructions stored in the memory. The instructions may be executable by the processor to cause the apparatus to receive, from a base station, a group-based acknowledgment feedback configuration for at least a first group of downlink transmissions to the UE, receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determine at least a first acknowledgment feedback indication for the downlink control information communication and a first group-based feedback codebook of the first group of downlink transmissions, and transmit the first acknowledgment feedback indication to the base station independently of the first group-based feedback codebook.

Another apparatus for wireless communication at a UE is described. The apparatus may include means for receiving, from a base station, a group-based acknowledgment feedback configuration for at least a first group of downlink transmissions to the UE, receiving, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determining at least a first acknowledgment feedback indication for the downlink control information communication and a first group-based feedback codebook of the first group of downlink transmissions, and transmitting the first acknowledgment feedback indication to the base station independently of the first group-based feedback codebook.

A non-transitory computer-readable medium storing code for wireless communication at a UE is described. The code may include instructions executable by a processor to receive, from a base station, a group-based acknowledgment feedback configuration for at least a first group of downlink transmissions to the UE, receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determine at least a first acknowledgment feedback indication for the downlink control information communication and a first group-based feedback codebook of the first group of downlink transmissions, and transmit the first acknowledgment feedback indication to the base station independently of the first group-based feedback codebook.

Some examples of the method, apparatuses, and non-transitory computer-readable medium described herein may further include operations, features, means, or instructions for receiving, from the base station, a request for a retransmission of the first group-based feedback codebook, and where a retransmission of the first acknowledgment feedback indication for the downlink control information communication is unable to be requested.

A method of wireless communication at a UE is described. The method may include receiving, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, receiving, from the base station, at least a first semi-persistent scheduling transmission based on a first semi-persistent scheduling configuration, receiving, from the base station, a request for acknowledgment feedback for all configured hybrid automatic repeat request process identifications, formatting acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission, and transmitting the acknowledgment feedback information to the base station.

An apparatus for wireless communication at a UE is described. The apparatus may include a processor, memory coupled with the processor, and instructions stored in the memory. The instructions may be executable by the processor to cause the apparatus to receive, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, receive, from the base station, at least a first semi-persistent scheduling transmission based on a first semi-persistent scheduling configuration, receive, from the base station, a request for acknowledgment feedback for all configured hybrid automatic repeat request process identifications, format acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission, and transmit the acknowledgment feedback information to the base station.

Another apparatus for wireless communication at a UE is described. The apparatus may include means for receiving, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, receiving, from the base station, at least a first semi-persistent scheduling transmission based on a first semi-persistent scheduling configuration, receiving, from the base station, a request for acknowledgment feedback for all configured hybrid automatic repeat request process identifications, formatting acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission, and transmitting the acknowledgment feedback information to the base station.

A non-transitory computer-readable medium storing code for wireless communication at a UE is described. The code may include instructions executable by a processor to receive, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, receive, from the base station, at least a first semi-persistent scheduling transmission based on a first semi-persistent scheduling configuration, receive, from the base station, a request for acknowledgment feedback for all configured hybrid automatic repeat request process identifications, format acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission, and transmit the acknowledgment feedback information to the base station.

In some examples of the method, apparatuses, and non-transitory computer-readable medium described herein, the predetermined new data indicator value is provided for an initial semi-persistent scheduling transmission of the first semi-persistent scheduling configuration.

In some examples of the method, apparatuses, and non-transitory computer-readable medium described herein, the predetermined new data indicator value is provided for the first semi-persistent scheduling transmission when a downlink control information transmission that scheduled the first semi-persistent scheduling transmission indicates that the first semi-persistent scheduling transmission is a retransmission of a prior semi-persistent scheduling transmission. In some examples of the method, apparatuses, and non-transitory computer-readable medium described herein, a CRC of the downlink control information transmission is scrambled with a configured scheduling radio network temporary identifier (CS-RNTI) associated with the UE.

A method of wireless communication at a base station is described. The method may include transmitting, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, transmitting, to the UE, a first semi-persistent scheduling transmission based on a first semi-persistent scheduling configuration, where the first semi-persistent scheduling transmission has an associated first new data indicator value and first hybrid acknowledgment repeat request process identification, and transmitting, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value.

An apparatus for wireless communication at a base station is described. The apparatus may include a processor, memory coupled with the processor, and instructions stored in the memory. The instructions may be executable by the processor to cause the apparatus to transmit, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, transmit, to the UE, a first semi-persistent scheduling transmission based on a first semi-persistent scheduling configuration, where the first semi-persistent scheduling transmission has an associated first new data indicator value and first hybrid acknowledgment repeat request process identification, and transmit, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value.

Another apparatus for wireless communication at a base station is described. The apparatus may include means for transmitting, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, transmitting, to the UE, a first semi-persistent scheduling transmission based on a first semi-persistent scheduling configuration, where the first semi-persistent scheduling transmission has an associated first new data indicator value and first hybrid acknowledgment repeat request process identification, and transmitting, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value.

A non-transitory computer-readable medium storing code for wireless communication at a base station is described. The code may include instructions executable by a processor to transmit, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, transmit, to the UE, a first semi-persistent scheduling transmission based on a first semi-persistent scheduling configuration, where the first semi-persistent scheduling transmission has an associated first new data indicator value and first hybrid acknowledgment repeat request process identification, and transmit, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value.

In some examples of the method, apparatuses, and non-transitory computer-readable medium described herein, a CRC of the downlink control information transmission is scrambled with a cell radio network temporary identifier (C-RNTI) associated with the UE. In some examples of the method, apparatuses, and non-transitory computer-readable medium described herein, the predetermined value of the first new data indicator value is provided by the base station in an initial downlink control information communication after the first semi-persistent scheduling transmission that uses a same hybrid acknowledgment repeat request (HARQ) process identification.

Some examples of the method, apparatuses, and non-transitory computer-readable medium described herein may further include operations, features, means, or instructions for receiving feedback from the UE for at least the first semi-persistent scheduling transmission and a downlink transmission scheduled with the initial downlink control information communication based on the first new data indicator value received from the UE after the initial downlink control information communication. In some examples of the method, apparatuses, and non-transitory computer-readable medium described herein, the first semi-persistent scheduling transmission is an initial semi-persistent scheduling transmission or a retransmission of a prior semi-persistent scheduling transmission.

DETAILED DESCRIPTION

Figure 1:
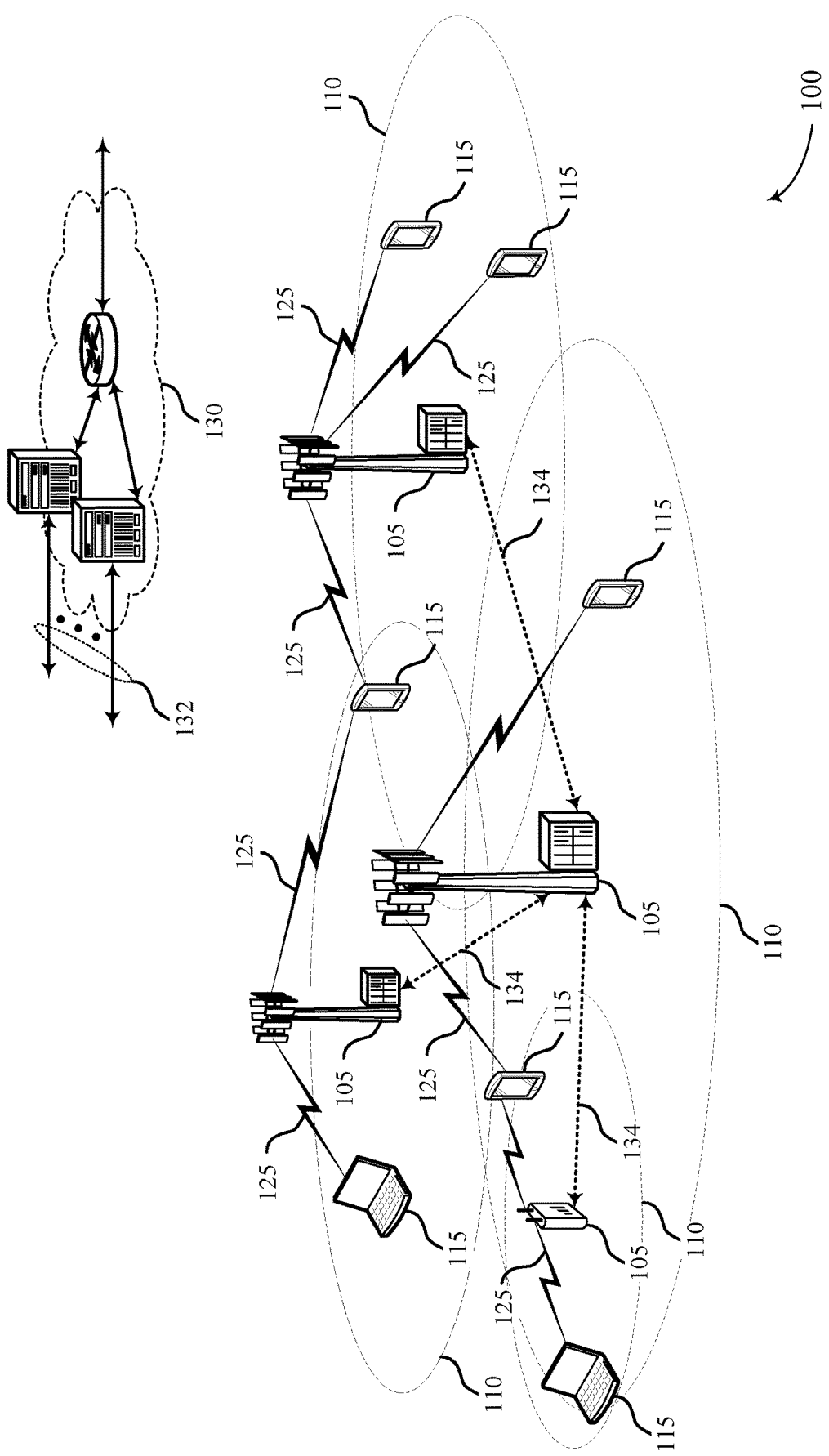
FIG. 1 illustrates an example of a system for wireless communications that supports group-based acknowledgment feedback for wireless communications in the presence of semi-persistent scheduling in accordance with aspects of the present disclosure.

The described aspects of the disclosure relate to improved methods, systems, devices, or apparatuses that facilitate feedback for transmissions or retransmissions, such as hybrid automatic repeat request (HARQ) acknowledgment/negative-acknowledgment (ACK/NACK) feedback reports. In some examples, the techniques described herein enable efficient feedback reporting of semi-persistent scheduling (SPS) transmissions along with one or more group-based acknowledgment feedback reports. Further, techniques are described that reduce ambiguity in cases where SPS acknowledgment feedback is provided in one-shot feedback reporting where feedback for each of a number of configured HARQ feedback process IDs are provided in a single feedback report.

In some cases, group-based acknowledgment feedback may be configured, and physical downlink shared channel (PDSCH) transmissions may be associated with multiple different groups, such as through explicit signaling of a group index in a downlink control information (DCI) transmission that schedules the PDSCH transmission. In some cases, the group index may be assigned to any PDSCH scheduled in the DCI. Thus, the number of HARQ ACK/NACK bits for one PDSCH group can change between successive requests for group-based feedback for the same PDSCH group, and HARQ feedback for all PDSCHs in the same group is carried in a same physical uplink control channel (PUCCH) transmission that provides the HARQ feedback report. Further, a single DCI can request HARQ feedback for one or more PDSCH groups in the same PUCCH. However, in cases where a UE is configured with SPS, HARQ feedback for SPS transmissions may also be transmitted by the UE. Techniques as discussed herein provide that HARQ feedback for SPS transmissions may be provided along with group-based HARQ feedback, which may thus enhance efficiency and reduce overhead by allowing a single HARQ feedback report to provide both the SPS and group-based regular HARQ feedback. SPS feedback may include HARQ feedback for SPS PDSCH transmissions, for a DCI that releases a SPS configuration, or combinations thereof.

Additionally, in some cases a one-shot feedback report may be triggered by a base station. A UE, in response to the one-shot feedback trigger, may format and transmit a HARQ feedback report that includes an ACK/NACK indication for each HARQ process ID that is configured at the UE. In order to avoid ambiguity, such HARQ feedback may also provide a new data indicator (NDI) value for each HARQ process ID, so the base station can differentiate whether the feedback corresponds to a latest transmitted PDSCH. However, NDI values for SPS transmissions, in that for regular PDSCH (scheduled with DCI with a cyclic redundancy check (CRC) scrambled with UE's cell radio network temporary identifier (C-RNTI)), when NDI is toggled it means a new transmission and when is not toggled it means retransmission of a prior PDSCH transmission. Thus, for regular PDSCH, providing the NDI value with the HARQ ACK/NACK indication allows the base station to determine if it is for a latest PDSCH transmission or not. However, when provided with SPS transmissions, for the initial SPS transmission, the NDI is considered to be toggled (always new transmission), and the value of the NDI in the activation DCI is 0. For retransmission (i.e., scheduled with DCI with CRC scrambled with a configured scheduling RNTI (CS-RNTI) of the UE and the value of NDI=1), NDI is considered to be not toggled. In such cases, for one-shot HARQ feedback when UE reports the NDI for each HARQ ID, if UE reports the value of NDI as is, there could be ambiguity on whether the feedback is for a regular PDSCH or the SPS transmission. For example, if the UE correctly receives SPS PDSCH (initial Tx, NDI=0) for a HARQ ID, later regular PDSCH is scheduled for the same HARQ ID with NDI=0 but UE misses the DCI (C-RNTI), and in one-shot feedback the UE reports ACK with NDI=0 for that HARQ ID based on the latest PDSCH from UE's perspective, thus the base station thinks that the regular PDSCH was decoded successfully when, in fact, it was not. Various aspects of the present disclosure remove such potential ambiguity by providing predetermined value (e.g., NDI=1) for the NDI reported with an initial SPS transmission or when a DCI indicates a retransmission of SPS acknowledgment feedback is requested. Further, a base station may use a predetermined NDI value (e.g., NDI=0) the first time a DCI is sent that requests an initial or retransmission of a regular PDSCH having the same HARQ process ID.

Techniques for providing HARQ feedback in the presence of SPS may enhance efficiency and flexibility in a wireless communications system, by providing acknowledgment feedback for regular downlink transmissions and SPS transmissions in a same acknowledgment feedback report. Additionally, such techniques may save uplink overhead to avoid unnecessary uplink transmission to provide acknowledgment feedback for SPS PDSCH separately from regular PDSCH. Additionally, acknowledgment feedback for more than one SPS reception of one or more SPS configurations may be provided in a single acknowledgment feedback report, instead of sending a report for each SPS PDSCH reception or active SPS configuration separately.

Aspects of the disclosure are initially described in the context of a wireless communications system. Various examples of feedback timelines and techniques are then described. Aspects of the disclosure are further illustrated by and described with reference to apparatus diagrams, system diagrams, and flowcharts that relate to group-based acknowledgment feedback for wireless communications in the presence of semi-persistent scheduling.

FIG. 1 illustrates an example of a wireless communications system 100 that supports group-based acknowledgment feedback for wireless communications in the presence of semi-persistent scheduling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ)

to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, a UE 115 may be configured with a SPS configuration that provides resources for a number of downlink SPS transmissions from a base station 105 to the UE 115. The SPS configuration may be activated (e.g., by an activation downlink control information (DCI) transmission), and periodic SPS transmissions along with regular downlink transmission (i.e., non-SPS transmissions) may be transmitted to the UE 115. In some cases, the regular downlink transmissions may be group-based transmissions in which each transmission is associated with a transmission group, and acknowledgment feedback (e.g., HARQ ACK/NACK feedback) may be provided on a group basis by the UE 115. In some cases, acknowledgement feedback for SPS transmissions may be provided along with the group-based acknowledgment feedback, and a group that is associated with the SPS feedback may be determined based on the SPS configuration, a DCI that activates the SPS, or a group of a regular downlink transmission received before or after the SPS transmission. Feedback for SPS transmissions may be provided with retransmissions of acknowledgment feedback, and may be appended or multiplexed with acknowledgment feedback for regular downlink transmissions.

In some cases, the UE 115 may receive another DCI that releases the SPS activation, and the UE 115 may provide acknowledgment feedback for such a DCI. In some cases, such acknowledgment feedback may be associated with a group that is indicated in the DCI that releases the SPS, or may be configured as part of the SPS configuration. The UE 115 in such cases may provide a retransmission of the SPS release DCI with a corresponding retransmission of feedback for the associated group.

Additionally or alternatively, the UE 115 may be configured for one-shot acknowledgment feedback, in which acknowledgment feedback for each configured HARQ process ID may be transmitted in response to a one-shot HARQ trigger. In some cases, such acknowledgment feedback may include an ACK/NACK bit associated with each HARQ process ID and an associated NDI value that resolves ambiguity related to whether the ACK/NACK bit is associated with a latest transmission associated with the corresponding HARQ process ID. In some cases, when one-shot acknowledgment feedback includes acknowledgment feedback for SPS transmissions, a predetermined value (e.g., NDI=1) may be provided by the UE 115 for the NDI reported with an initial SPS transmission or when a DCI indicates a retransmission of SPS acknowledgment feedback is requested. Further, a base station 105 may use a predetermined NDI value (e.g., NDI=0) the first time a DCI is sent after a HARQ process ID is used for SPS (either a first transmission or a retransmission associated with MAC entity's CS-RNTI), and the DCI schedules a regular PDSCH (CRC of the DCI is scrambled with C-RNTI) with the same HARQ process ID.

Figure 2:
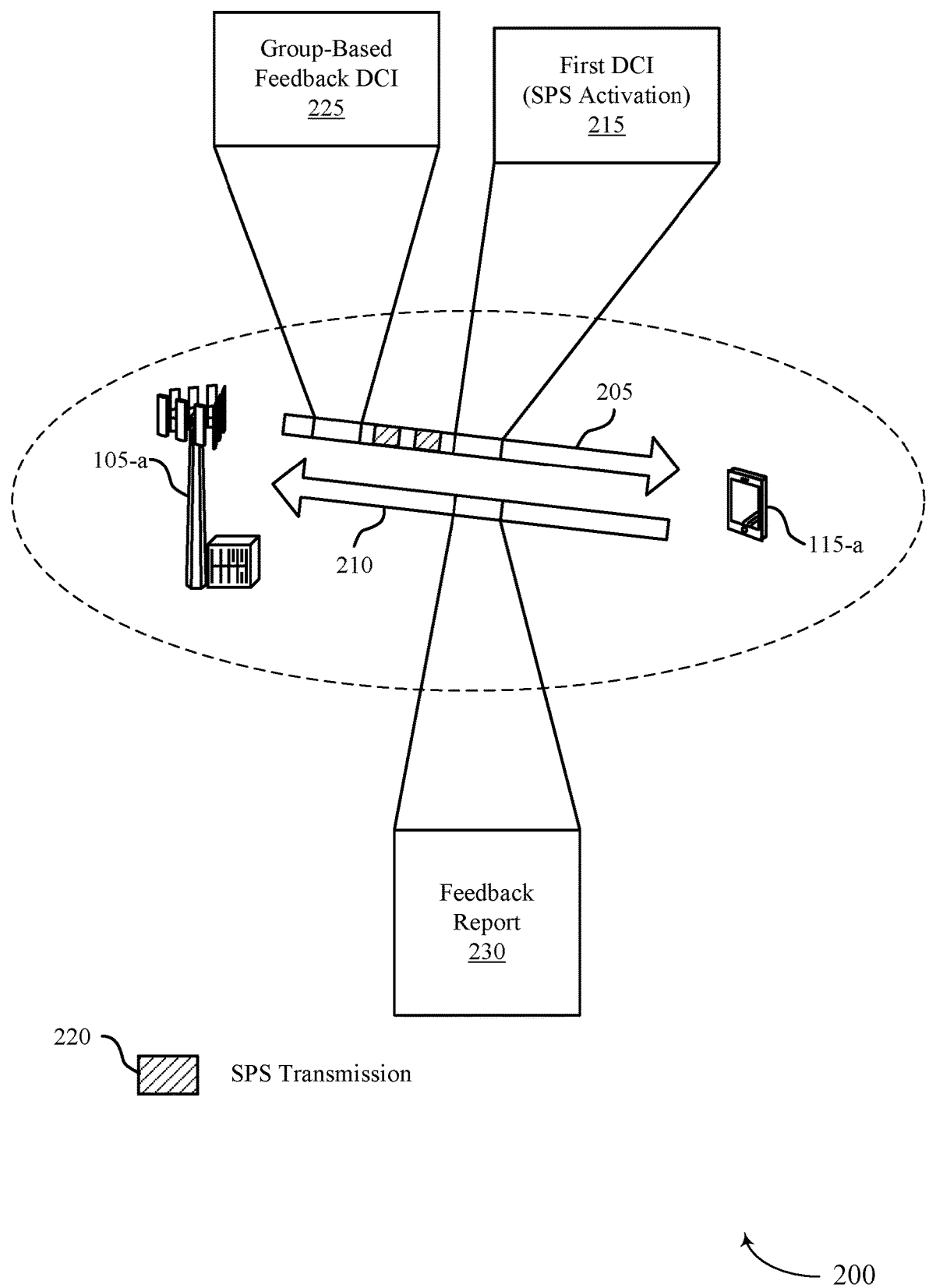
FIG. 2 illustrates an example of a wireless communications system that supports group-based acknowledgment feedback for wireless communications in the presence of semi-persistent scheduling in accordance with aspects of the present disclosure.

FIG. 2 illustrates an example of a wireless communications system 200 that supports group-based acknowledgment feedback for wireless communications in the presence of semi-persistent scheduling in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115 as described with reference to FIG. 1.

As described herein, base station 105-*a* and UE 115-*a* may employ HARQ feedback techniques to indicate whether data has been received correctly at UE 115-*a*. For example, base station 105-*a* may transmit one or more downlink messages to UE 115-*a* on resources of a downlink carrier 205. Accordingly, UE 115-*a* may transmit an indication of whether the one or more downlink messages were received and decoded correctly on resources of an uplink carrier 210. In some cases, carriers 205 and 210 may be the same carrier. In some cases, carriers 205 and 210 may be component carriers (CCs), and a number of different CCs may be used for communications between the UE 115-*a* and the base station 105-*a*. In some cases, carriers 205 and 210 may use licensed spectrum, shared or unlicensed spectrum, or combinations thereof. When using unlicensed or shared spectrum, the UE 115-*a* and base station 105-*a* may use a contention-based access technique (e.g., a listen before talk (LBT) procedure) to determine if a channel is available prior to initiating transmissions.

As discussed herein, the base station 105-*a* may configure the UE 115-*a* with one or more SPS configurations. The SPS configurations may be provided to the UE 115-*a* using RRC signaling, for example. A SPS configuration may then be activated at the UE 115-*a* by a first DCI 215, which may indicate that a first SPS configuration is activated, and that subsequent SPS PDSCH transmissions will be sent by the base station 105-*a*. Further, in some cases the base station 105-*a* may configure the UE 115-*a* with group-based PDSCH transmissions, in which acknowledgment feedback for one or more groups of PDSCH transmissions may be transmitted by the UE 115-*a* in a feedback report 230 that is triggered by a group-based feedback DCI 225.

In some cases, the UE 115-*a* may not be configured to provide feedback for SPS transmissions 220 that is associated with a group of downlink transmissions, and thus SPS acknowledgment feedback would not be associated with a PDSCH group. In such cases, the SPS feedback may be provided in an initial feedback report 230, along with group-based acknowledgment feedback, but if a retransmission request of the group-based feedback is requested, the SPS acknowledgment feedback would not be provided with the retransmitted group-based feedback. Similarly, in cases where a subsequent DCI provides a release of the SPS configuration to the UE 115-*a*, an acknowledgment of the subsequent DCI may provide HARQ ACK/NACK feedback that is not associated with a PDSCH group, and in such cases if acknowledgment feedback for one or more groups is retransmitted, the acknowledgment for the SPS release DCI would not be included.

In other cases, the UE 115-*a* be configured to provide acknowledgment feedback for SPS transmissions 220 on a group basis by the UE 115. In some cases, acknowledgement feedback for the SPS transmissions 220 may be provided along with the group-based acknowledgment feedback, and a group that is associated with the SPS feedback may be determined based on the SPS configuration, the first DCI 215 that activates the SPS, or a group of a regular downlink transmission received before or after the SPS transmissions 220. Feedback for SPS transmissions may thus be provided with retransmissions of acknowledgment feedback for the particular group, and may be appended or multiplexed with acknowledgment feedback for regular downlink transmissions as discussed in various examples with reference to FIGS. 3 and 4.

In some cases, the UE 115-a may receive another DCI that releases the SPS activation, and the UE 115-a may provide acknowledgment feedback for such a DCI. In some cases, such acknowledgment feedback may be associated with a group that is indicated in the DCI that releases the SPS, or may be configured as part of the SPS configuration. The UE 115-a in such cases may provide a retransmission of the SPS release DCI with a corresponding retransmission of feedback for the associated group.

In further cases, the UE 115-a may be configured for one-shot acknowledgment feedback, in which acknowledgment feedback for each configured HARQ process ID may be transmitted in response to a one-shot HARQ trigger. In some cases, such acknowledgment feedback may include an ACK/NACK bit associated with each HARQ process ID and an associated NDI value that resolves ambiguity related to whether the ACK/NACK bit is associated with a latest transmission associated with the corresponding HARQ process ID. In some cases, when one-shot acknowledgment feedback includes acknowledgment feedback for SPS transmissions, a predetermined value (e.g., NDI=1) may be provided by the UE 115-a for the NDI reported with an initial SPS transmission or when a DCI indicates a retransmission of SPS acknowledgment feedback is requested. Further, a base station 105-a may use a predetermined NDI value (e.g., NDI=0) the first time a DCI is sent after a HARQ process ID is used for SPS (either a first transmission or a retransmission associated with MAC entity's CS-RNTI), and the DCI schedules a regular PDSCH (CRC of the DCI is scrambled with C-RNTI) with the same HARQ process ID. Various examples of such one-shot feedback techniques are illustrated and discussed with reference to FIG. 5.

Figure 3:
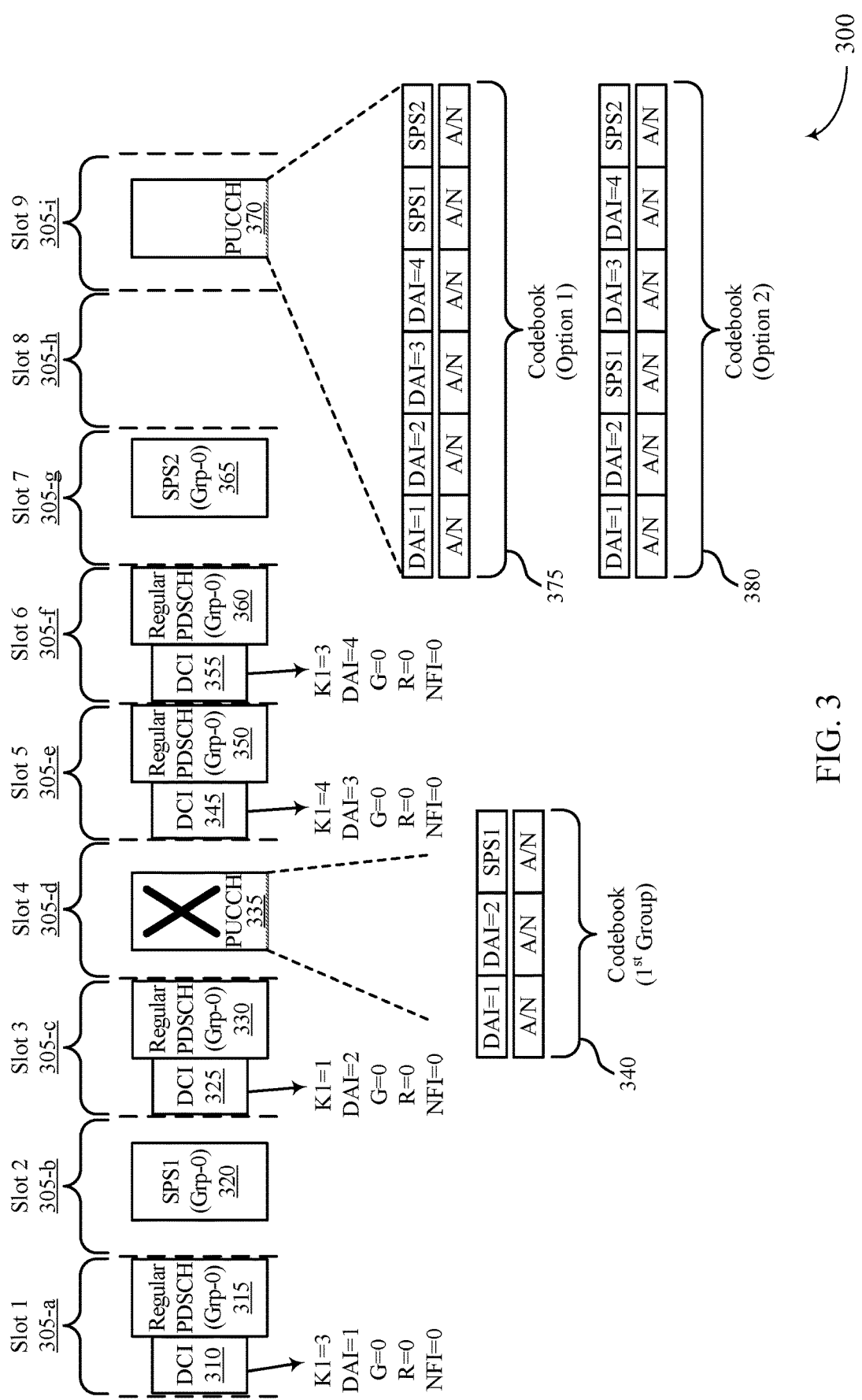
FIGS. 3 and 4 illustrate examples of feedback timelines that supports group-based acknowledgment feedback for wireless communications in the presence of semi-persistent scheduling in accordance with aspects of the present disclosure.

FIG. 3 illustrates an example of a feedback timeline 300 that supports group-based acknowledgment feedback for wireless communications in the presence of semi-persistent scheduling in accordance with aspects of the present disclosure. In some examples, feedback timeline 300 may implement aspects of wireless communications system 100 or 200. In this example, a number of transmission slots 305 are illustrated, including a first transmission slot 305-a through a ninth transmission slot 305-i. In some cases, transmissions using transmission slots 305 may use licensed spectrum, unlicensed spectrum, or combinations thereof.

In this example, a UE may be configured with a SPS configuration, such as through RRC signaling. In some cases, multiple SPS configurations may be provided to a UE, including two or more SPS configurations that are associated with a same PUCCH group. In this example, the SPS configuration has been activated, such that the UE monitors for SPS transmissions according to a SPS periodicity, which in this example is five slots. A first DCI 310 may be transmitted in the first slot 305-a, that may include scheduling information for a first regular PDSCH transmission 315 for a first PDSCH group (group 0). In this example, the first DCI 310 has a K1 value of K1=3 (i.e., that indicates the PUCCH for HARQ feedback is three slots after the PDSCH transmission), a downlink assignment indicator (DAI) value of DAI=1 (i.e., that indicates the DAI is for an initial acknowledgment feedback indicator to be included in an acknowledgment codebook), a group indicator value of G=0 (i.e., that indicates the PDSCH transmission 315 is in the first PDSCH group), an other group request value of R=0 (i.e., that indicates that feedback for another PDSCH group is not requested with the PUCCH transmission that provides HARQ feedback), and a new acknowledgment feedback indicator (NFI) value of NFI=0 (i.e., a toggle bit that, when toggled, indicates the DAI for the downlink transmission group is to be reset). For each PDSCH transmission, the UE may generate a HARQ ACK/NACK feedback indication based on whether the corresponding transmission was successfully received and decoded.

In this example, a first SPS transmission 320 may be transmitted in the second slot 305-b. For each SPS the UE may generate a HARQ ACK/NACK feedback indication based on whether the corresponding transmission was successfully received and decoded. In this example, the first SPS 320 is associated with the first group (i.e., G=0). The indication of which group a SPS transmission belongs to may be provided using one of a number of techniques. In some cases, the group for an SPS configuration may be indicated in the DCI activating the SPS (e.g., as the value of "G" in the downlink DCI that activates the SPS configuration). In other cases, the group for an SPS configuration may be configured as part of SPS configuration. In each of these case, all SPS PDSCH receptions of a SPS configuration have the same group as indicated (i.e. from one occasion to another occasion, the group does not change). In other cases, the group for one or more SPS transmissions may be determined based on a DCI detected after or before the SPS PDSCH, that schedules a regular PDSCH and indicates the group of the regular PDSCH, or the group for the SPS transmissions may be determined from the PDSCH group of a regular PDSCH received after or before the SPS PDSCH. In such cases, the PDSCH group indicated in the DCI or of the regular PDSCH may be used for the SPS group when both the SPS PDSCHs and regular PDSCHs are included in a same HARQ feedback report. In some cases, if no such PDSCH is present before or after the SPS PDSCH, or within a threshold number of slots, then no PDSCH group is defined for the SPS PDSCH, or a default PDSCH group (e.g. group 0) is used (or one of the other options is used, which may effectively provide that the DCI activating the SPS or the SPS configuration provide the default PDSCH group, which may be changes if regular PDSCH transmissions of a different group are transmitted relatively closely in time with the SPS PDSCHs that are to have HARQ feedback reported in a same feedback report).

Continuing with the example of FIG. 3, a second DCI 325 may be received in third slot 305-c, that may have values of K1=1, DAI=2, G=0, R=0, and NFI=0, and the UE may receive a second regular PDSCH transmission 330 responsive to the second DCI 325 for the first PDSCH group. In this example the fourth slot 305-d may include resources for an uplink transmission, namely a PUCCH transmission 335, for reporting of the group-based acknowledgment feedback.

The PUCCH transmission 335 may include a feedback codebook 340 that includes HARQ ACK/NACK bits for the SPS transmissions received prior to the PUCCH 335, as well as HARQ ACK/NACK bits for regular PDSCH transmissions of PDSCH transmission 315 and PDSCH transmission 330. In some cases, the UE may determine which SPS transmissions are to be reported in a feedback report based on a timing of the second DCI transmission 325, a timing of the PUCCH transmission 335 with the feedback report, a UE capability (e.g., an N1 processing capability of the UE), or combinations thereof. In the example of FIG. 3, the feedback codebook 340 includes three bits, including two bits for regular PDSCH transmission 315 and regular PDSCH transmission 330, for the DAI=1 and DAI=2 indications, and one bit corresponding to the first SPS 320. In this example, the SPS feedback bits are appended to the regular PDSCH feedback bits in a single codebook, although numerous other examples may have feedback formatted in other ways, such as separate sub-codebooks for regular PDSCH and SPS feedback, multiple codebooks that include feedback for two or more PDSCH groups, multiple codebooks that include feedback for SPS transmissions of multiple activated SPS configurations in a PUCCH group, multiplexing of feedback bits, or any combinations thereof. Several examples of feedback report information and formatting are discussed herein, with the understanding that such examples are provided for illustration and discussion purposes of various techniques provided herein, and are not intended to limit the scope of the present disclosure.

As discussed herein, a UE receiving downlink transmissions of the downlink transmission group may format a feedback codebook 340 that includes bits associated with each DAI indicated in the received DAI fields. Thus, in this example, feedback codebook 340 includes an ACK/NACK bit associated with DAI=1 of the first slot 305-a, and a second ACK/NACK bit associated with DAI=2 of the third slot 305-c. In this example, the PUCCH transmission 335 may not be successfully received at the base station. For example, interference or low channel quality between the UE and base station may have prevented the base station from successfully receiving and decoding the PUCCH transmission 335. In some cases, the UE and base station may operate in shared or unlicensed spectrum, and the PUCCH transmission 335 may not be received due to an unsuccessful contention-based channel access procedure (e.g., a LBT procedure failed) that did not allow the UE to send PUCCH transmission 335.

In this example, the base station may determine that the PUCCH transmission 335 is not successfully received, and may thus maintain DCI parameters for group-based acknowledgment feedback in order to obtain the feedback associated with the first slot 305-a, the second slot 305-b, and the third slot 305-c. In this example in fifth slot 305-e, the base station may transmit a third DCI 345 for an associated third regular PDSCH transmission 350 for the first PDSCH group. In this example, the third DCI 345 includes group-based feedback parameters of K1=4 (i.e., that the associated acknowledgment feedback is to be provided in the ninth slot 305-i), DAI=3 (i.e., the next consecutive DAI count indicating that one or more DAIs have not been missed), G=0 (i.e., for the same group as the first DCI 310 and second DCI 325), R=0 (i.e., that feedback for another group is not requested), and NFI=0 (i.e., that the DAI has not been reset based on not being toggled from the prior DCI). In this example a sixth slot 305-f may include a fourth DCI transmission 355 for a fourth regular PDSCH transmission 360. In this case, the fourth DCI transmission 355 includes group-based feedback parameters of K1=3 (i.e., that the associated acknowledgment feedback is to be provided in the ninth slot 305-i), DAI=4, G=0 (i.e., for the same group as the prior DCI/PDSCH transmissions), R=0 (i.e., that feedback for another group is not requested), and NFI=0 (i.e., that the DAI has not been reset based on not being toggled from the prior DCI). The seventh slot 305-g may include a second SPS transmission 365 in accordance with the SPS configuration.

In this example the ninth slot 305-i may include uplink resources for a PUCCH transmission 370 with the group-based feedback report. In this example, based on the feedback parameters of the various DCIs, the UE may determine a second feedback codebook that provides ACK/NACK indications for each regular PDSCH and SPS PDSCH. In some cases, if there is one or more ACK/NACK bits (corresponding to one or more SPS PDSCH receptions) appended to feedback codebook in a given HARQ reporting, when feedback for that group is requested again for a subsequent HARQ reporting without the NFI of the PDSCH group being toggled (or when DCI scheduling PDSCH from second group requests feedback for the first group, i.e. R=1), then the ACK/NACK bits for SPS are also reported again. Further, if there are also one or more new SPS PDSCH reception(s) whose ACK/NACK are to be included in the subsequent HARQ reporting (that were not included in the original HARQ-Ack reporting), then ACK/NACK bits for the old SPS PDSCH reception(s) and the new SPS PDSCH reception(s) are both included. In some cases, a feedback codebook of a first option 375 may include ACK/NACK bits that are appended to the end of the codebook (or sub-codebook) for that PDSCH group. In some cases, the order of the ACK/NACK bits to be appended is based on the order of reception of the SPS PDSCHs. In other cases, the order of the ACK/NACK bits to be appended is based on the HARQ process ID of the SPS PDSCHs. In a second option for feedback codebook 380, for old SPS PDSCH reception(s), ACK/NACK bits are added after ACK/NACK bits of the old regular PDSCH (DAI-based) that were also reported in the original HARQ reporting, and for new SPS PDSCH reception(s), ACK/NACK bits are added after ACK/NACK bits of the new regular PDSCH (DAI-based).

In some cases, another DCI may be transmitted by the base station, and received at the UE, that releases the SPS configuration at the UE. In such cases, the UE may provide acknowledgment feedback for the DCI releasing SPS. In some cases, when group-based dynamic HARQ feedback is configured, for the purpose of HARQ feedback of the SPS release DCI, the PDSCH group may be indicated in the DCI releasing the SPS (e.g., "G" in the downlink DCI that releases the SPS configuration), or the PDSCH group may be configured as part of SPS configuration. The HARQ feedback for SPS release is different from HARQ feedback for SPS PDSCH reception, as there is no associated PDSCH for SPS release (i.e., ACK/NACK is for acknowledging the DCI that releases the SPS and not for acknowledging decoding of any PDSCH). Thus the PDSCH group for SPS release is only for the purpose of HARQ retriggering mechanisms. Further, unlike SPS PDSCH reception, SPS release has a corresponding DAI value indicated in the DCI releasing the SPS, when dynamic codebook is used.

Figure 4:
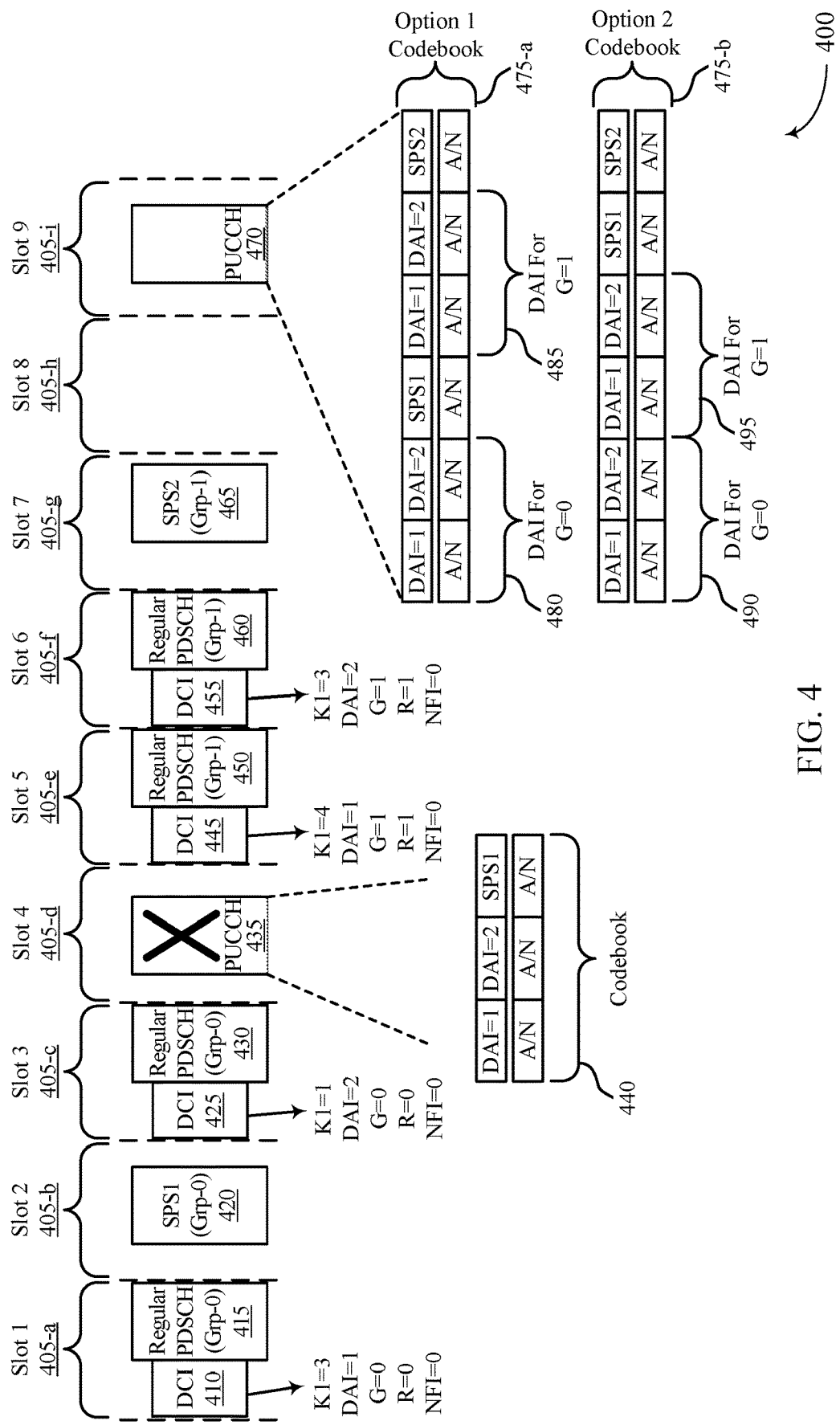

FIG. 4 illustrates an example of a feedback timeline 400 that supports group-based acknowledgment feedback for wireless communications in the presence of semi-persistent scheduling in accordance with aspects of the present disclosure. In some examples, feedback timeline 400 may implement aspects of wireless communications system 100 or 200.

In this example, both regular PDSCH transmissions and SPS PDSCH transmissions from multiple groups are transmitted, and HARQ feedback provided according to techniques discussed herein. In this example, a UE may be configured with a SPS configuration, such as through RRC signaling. In this example, the SPS configuration has been activated, such that the UE monitors for SPS transmissions according to a SPS periodicity, which in this example is five slots. A first DCI 410 may be transmitted in the first slot 405-a, that may include scheduling information for a first regular PDSCH transmission 415 for a first PDSCH group (group 0). In this example, the first DCI 410 has a K1 value of K1=3 (i.e., that indicates the PUCCH for HARQ feedback is three slots after the PDSCH transmission), a downlink assignment indicator (DAI) value of DAI=1 (i.e., that indicates the DAI is for an initial acknowledgment feedback indicator to be included in an acknowledgment codebook), a group indicator value of G=0 (i.e., that indicates the PDSCH transmission 415 is in the first PDSCH group), an other group request value of R=0 (i.e., that indicates that feedback for another PDSCH group is not requested with the PUCCH transmission that provides HARQ feedback), and a new acknowledgment feedback indicator (NFI) value of NFI=0 (i.e., a toggle bit that, when toggled, indicates the DAI for the downlink transmission group is to be reset). For each PDSCH transmission, the UE may generate a HARQ ACK/NACK feedback indication based on whether the corresponding transmission was successfully received and decoded.

In this example, a first SPS transmission 420 may be transmitted in the second slot 405-b. For each SPS the UE may generate a HARQ ACK/NACK feedback indication based on whether the corresponding transmission was successfully received and decoded. In this example, the first SPS 420 is associated with the first group (i.e., G=0). The indication of which group a SPS transmission belongs to may be provided using one of a number of techniques, as discussed above with reference to FIG. 3. A second DCI 425 may be received in third slot 405-c, that may have values of K1=1, DAI=2, G=0, R=0, and NFI=0, and the UE may receive a second regular PDSCH transmission 430 responsive to the second DCI 425 for the first PDSCH group. In this example the fourth slot 405-d may include resources for an uplink transmission, namely a PUCCH transmission 435, for reporting of the group-based acknowledgment feedback.

The PUCCH transmission 435 may include a feedback codebook 440 that includes HARQ ACK/NACK bits for the SPS transmissions received prior to the PUCCH 435, as well as HARQ ACK/NACK bits for regular PDSCH transmissions of PDSCH transmission 415 and PDSCH transmission 430. In some cases, the UE may determine which SPS transmissions are to be reported in a feedback report based on a timing of the second DCI transmission 425, a timing of the PUCCH transmission 435 with the feedback report, a UE capability (e.g., an N1 processing capability of the UE), or combinations thereof. In the example of FIG. 4, the feedback codebook 440 includes three bits, including two bits for regular PDSCH transmission 415 and regular PDSCH transmission 430, for the DAI=1 and DAI=2 indications, and one bit corresponding to the first SPS 420. In this example, the SPS feedback bits are appended to the regular PDSCH feedback bits in a single codebook, although numerous other examples may have feedback formatted in other ways, such as separate sub-codebooks for regular PDSCH and SPS feedback, multiple codebooks that include feedback for two or more PDSCH groups, multiple codebooks that include feedback for SPS transmissions of multiple activated SPS configurations in a PUCCH group, multiplexing of feedback bits, or any combinations thereof.

As discussed herein, a UE receiving downlink transmissions of the downlink transmission group may format a feedback codebook 440 that includes bits associated with each DAI indicated in the received DAI fields. Thus, in this example, feedback codebook 440 includes an ACK/NACK bit associated with DAI=1 of the first slot 405-a, and a second ACK/NACK bit associated with DAI=2 of the third slot 405-c. In this example, the PUCCH transmission 435 may not be successfully received at the base station. For example, interference or low channel quality between the UE and base station may have prevented the base station from successfully receiving and decoding the PUCCH transmission 435. In some cases, the UE and base station may operate in shared or unlicensed spectrum, and the PUCCH transmission 435 may not be received due to an unsuccessful contention-based channel access procedure (e.g., a LBT procedure failed) that did not allow the UE to send PUCCH transmission 435.

In this example, in fifth slot 405-e, the base station may transmit a third DCI 445 for an associated third regular PDSCH transmission 450 for the second PDSCH group (Group G=1). In this example, the third DCI 445 includes group-based feedback parameters of K1=4 (i.e., that the associated acknowledgment feedback is to be provided in the ninth slot 405-i), DAI=1 (i.e., the first DAI count of the second group, indicating that one or more DAIS have not been missed), G=1 (i.e., for a different group than the first DCI 410 and second DCI 425), R=1 (i.e., that feedback for the other group is requested), and NFI=0 (i.e., that the DAI has not been reset based on not being toggled from the prior DCI). In this example a sixth slot 405-f may include a fourth DCI transmission 455 for a fourth regular PDSCH transmission 460 for the second group. In this case, the fourth DCI transmission 455 includes group-based feedback parameters of K1=3 (i.e., that the associated acknowledgment feedback is to be provided in the ninth slot 405-i), DAI=2, G=1 (i.e., for the second PDSCH group), R=1 (i.e., that feedback for the other group is requested), and NFI=0 (i.e., that the DAI has not been reset based on not being toggled from the prior DCI). The seventh slot 405-g may include a second SPS transmission 465 in accordance with the SPS configuration, which may be associated with the second PDSCH group (Grp-1).

In this example the ninth slot 405-i may include uplink resources for a PUCCH transmission 470 with the group-based feedback report. In this example, based on the feedback parameters of the various DCIs, the UE may determine a second feedback codebook that provides ACK/NACK indications for each regular PDSCH and SPS PDSCH. In this example, feedback for both PDSCH groups are included in the PUCCH transmission 470, including HARQ feedback for SPS PDSCH reception that is placed in the feedback codebook with the HARQ feedback for regular PDSCH. In this example, two exemplary options for formatting the feedback codebook are provided, with a first option 475-a that provides one or more ACK/NACK bits for SPS PDSCH reception (if any) for a PDSCH group that are appended to the corresponding sub-codebook for that PDSCH group, such that feedback for the first SPS (SPS1) of the first PDSCH group is appended to a first sub-codebook 480 for the first PDSCH group, and feedback for the second SPS (SSP2) of the second PDSCH group is appended to a second sub-codebook 485 for the second PDSCH group. In a second option, one or more ACK/NACK bits for SPS PDSCH reception for one or more PDSCH group is appended to the end of the codebook irrespective of association of SPS PDSCH with a PDSCH group (if there is an association), such that a first sub-codebook 490 for the first PDSCH group is followed by a second sub-codebook 495 for the second PDSCH group, which is followed by the SPS ACK/NACK bits for SPS1 and SPS2.

Figure 5:
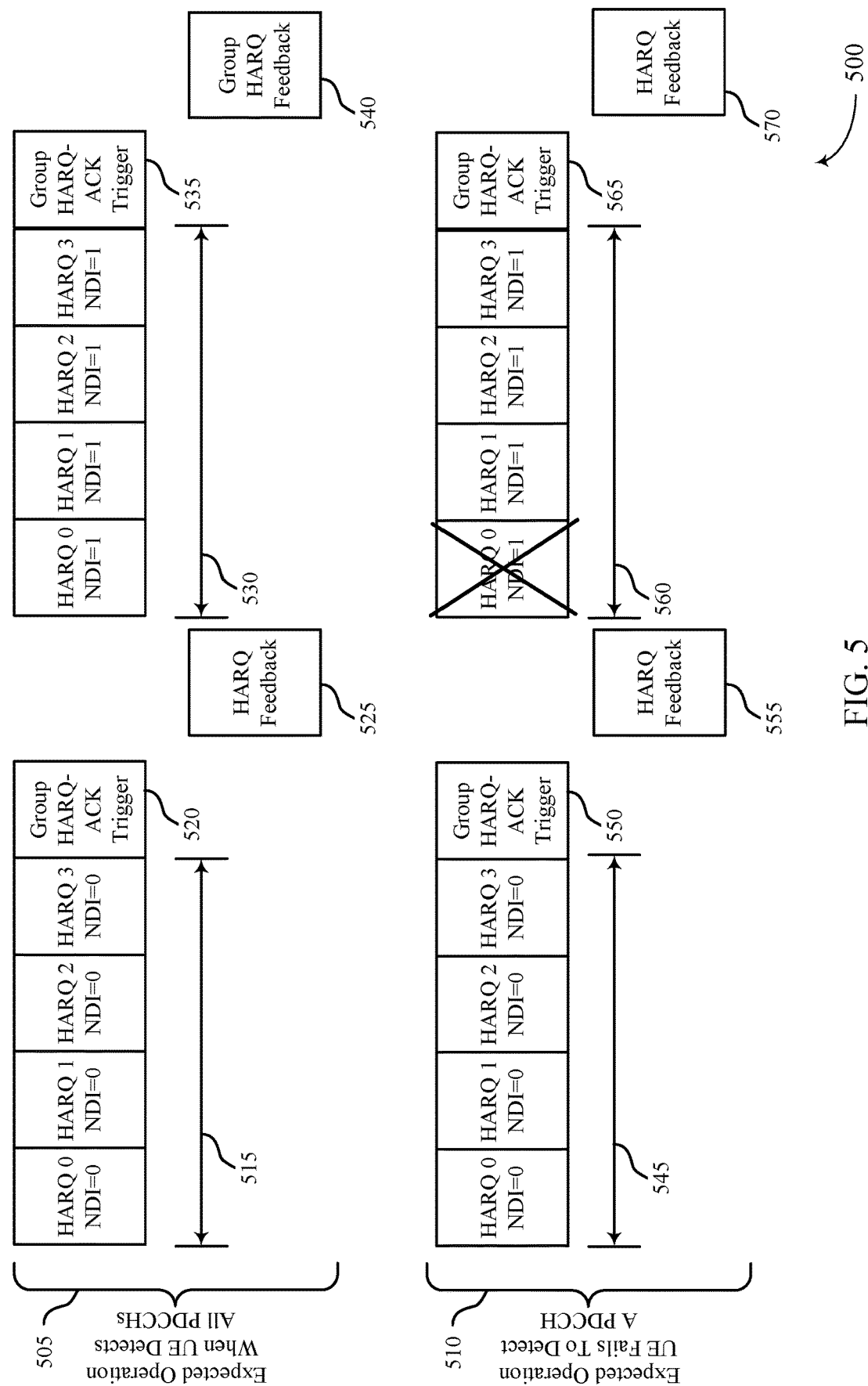
FIG. 5 illustrates an example of a one-shot HARQ configuration that supports group-based acknowledgment feedback for wireless communications in the presence of semi-persistent scheduling in accordance with aspects of the present disclosure.

FIG. 5 illustrates an example of a one-shot HARQ configuration 500 that supports group-based acknowledgment feedback for wireless communications in the presence of semi-persistent scheduling in accordance with aspects of the present disclosure. In some examples, one-shot HARQ configuration 500 may implement aspects of wireless communications system 100 or 200.

In this example, a base station may transmit a first subset of downlink transmissions 515, which the UE may attempt to receive and decode. In this example, the base station may also transmit a group HARQ trigger 520 to trigger a one-shot acknowledgment feedback for each of the configured HARQ process IDs at the UE. For example, the UE may have four HARQ processes configured, having HARQ process IDs 0 through 3. Further, scheduling information provided for downlink transmissions may include a NDI for each transmission, which the UE may use in decoding the associated transmissions. In this example, downlink transmissions (e.g., TBs) associated with HARQ process IDs 0 through 3, each having an NDI of zero, may be scheduled as the first subset of downlink transmissions 515. Further, a second subset of downlink transmissions 530 may be scheduled for HARQ process IDs 0 through 3 that each have an NDI of one. When the UE detects all of the PDCCHs for HARQ process IDs 0 through 3, as indicated at timeline 505, a first HARQ feedback 525 may be a one-shot feedback that provide ACK/NACK for HARQ process IDs 0 through 3. The first HARQ feedback 525 may provide, for each HARQ process ID, the associated NDI value. A second HARQ feedback 540 may be triggered by group HARQ trigger 535, and may again provide ACK/NACK for HARQ process IDs 0 through 3.

In cases where the UE detects less than all of the PDCCHs for HARQ process IDs 0 through 3, as indicated at timeline 510, the UE may detect all DCIs for a first subset of downlink transmissions 545, and report HARQ feedback 555 for each HARQ process ID based on the group HARQ trigger 550. Each PDCCH for the first subset of downlink transmissions 545 may have a NDI value of NDI=0, in this example, and the HARQ feedback may report ACK and NDI=0 for each of the first subset of downlink transmissions 545. However, in second subset of downlink transmissions 560, the UE may miss a first transmission associated with HARQ process ID 0, but receive each of the other downlink transmissions associated with HARQ process IDs 1 through 3. The UE may, based on group HARQ trigger 565, transmit a subsequent HARQ feedback 570 that, in this case, may include an ACK for each HARQ process ID 0 through 3. However, for HARQ process ID 0, the associated NDI value is reported as 0 (corresponding to the last successfully received PDCCH associated with HARQ process ID 0). Thus, the receiving base station may determine that the UE missed the PDCCH associated with HARQ process ID 0. It is noted that this example is provided for purposes of discussion and illustration, and numerous different examples of downlink transmissions may be used to implement techniques discussed herein.

As indicated above, NDI values for SPS transmissions may be treated differently in some systems. For example, when provided with SPS transmissions, for the initial SPS transmission, the NDI is considered to be toggled (always new transmission), and the value of the NDI in the activation DCI is 0. For retransmission (i.e., scheduled with DCI with CRC scrambled with a CS-RNTI of the UE and the value of NDI=1), NDI is considered to be not toggled. In such cases, for one-shot HARQ feedback when UE reports the NDI for each HARQ ID, if UE reports the value of NDI as is, there could be ambiguity on whether the feedback is for a regular PDSCH or the SPS transmission. Accordingly, in some aspects of the disclosure, when reporting a NDI value in one-shot HARQ feedback, the UE may report a predetermined NDI value (e.g., NDI=1) for SPS PDSCH reception of an initial SPS transmission, or when a DCI scheduling the PDSCH has CRC scrambled with CS-RNTI (indicating a retransmission of the SPS). In such a manner, the predetermined NDI value indicates that the initial (or retransmission) SPS is received, but if another regular PDSCH was missed for that HARQ process ID (which would be toggled to NDI=0) it would indicate to the base station that the PDCCH for the regular PDSCH was missed. Further, in such cases the base station may use a predetermined NDI value (e.g., NDI=0) the first time DCI is sent with C-RNTI after an SPS (initial transmission or retransmission) with the same HARQ process ID, so that the UE reports NDI=0 for regular PDSCH immediately after SPS when same HARQ process ID was used, and thus ambiguity in the HARQ feedback is avoided.

Figure 6:
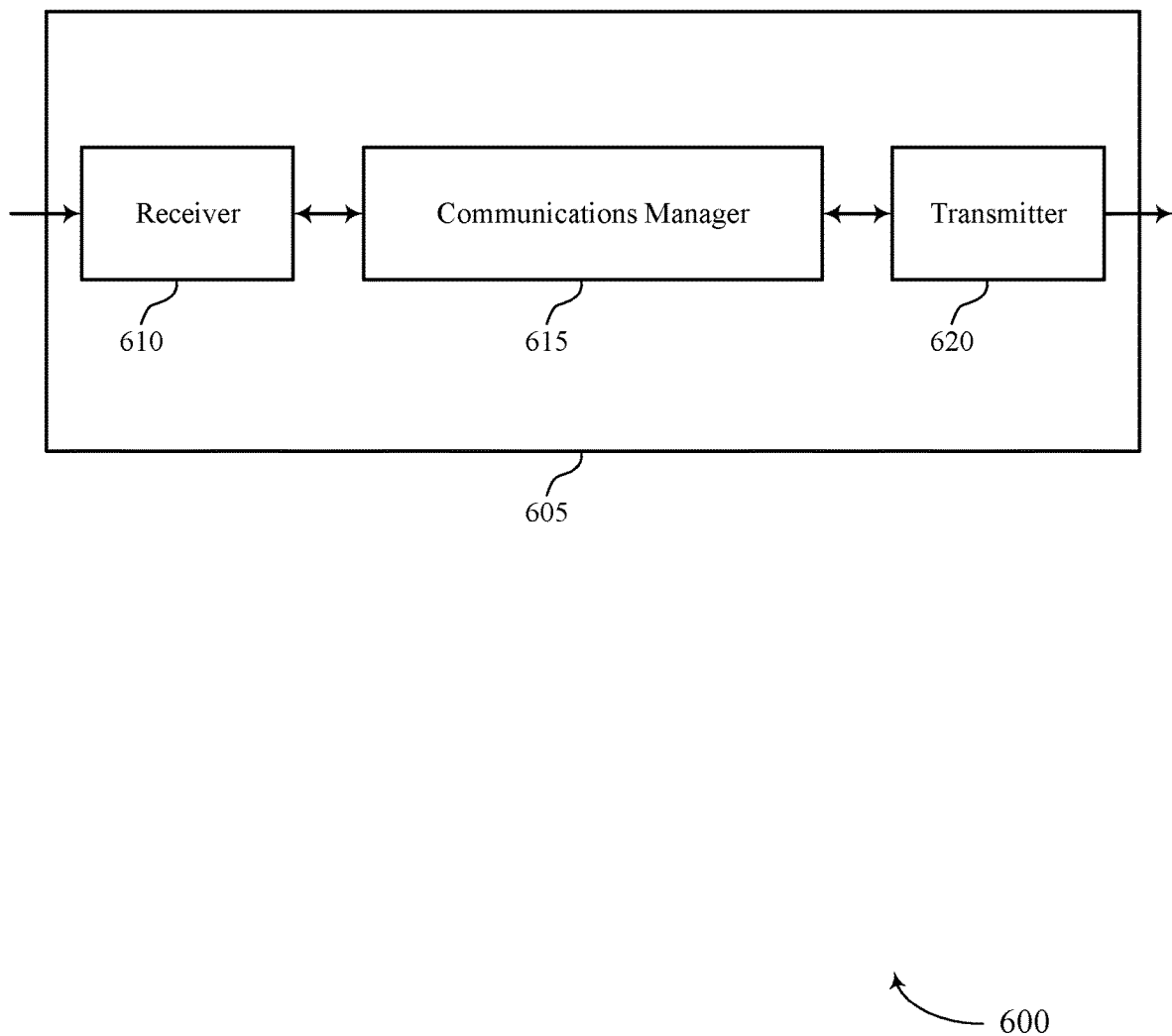
FIGS. 6 and 7 show block diagrams of devices that support group-based acknowledgment feedback for wireless communications in the presence of semi-persistent scheduling in accordance with aspects of the present disclosure.

FIG. 6 shows a block diagram 600 of a device 605 that supports group-based acknowledgment feedback for wireless communications in the presence of semi-persistent scheduling in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to group-based acknowledgment feedback for wireless communications in the presence of semi-persistent scheduling, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a group-based acknowledgment feedback configuration for at least a first group of downlink transmissions to the UE, receive, from the base station, at least a first semi-persistent scheduling configuration that indicates resources for a set of downlink semi-persistent scheduling transmissions to the UE, determine, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions, and transmit the first group-based feedback indication and the first acknowledgment feedback indication in a first feedback communication to the base station.

The communications manager 615 may also receive, from a base station, a group-based acknowledgment feedback configuration for at least a first group of downlink transmissions to the UE, receive, from the base station, at least a first semi-persistent scheduling configuration that indicates resources for a set of downlink semi-persistent scheduling transmissions to the UE, determine at least a first acknowledgment feedback indication for a first downlink semi-persistent scheduling transmission and a first group-based feedback codebook of the first group of downlink transmissions, and transmit the first acknowledgment feedback indication to the base station independently of the first group-based feedback codebook.

The communications manager 615 may also receive, from a base station, a group-based acknowledgment feedback configuration for at least a first group of downlink transmissions to the UE, receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determine, based on one or more of the group-based acknowledgment feedback configuration or the downlink control information communication, that at least a first acknowledgment feedback indication for the downlink control information communication is to be included with a first group-based feedback indication of the first group of downlink transmissions, and transmit the first group-based feedback indication and the first acknowledgment feedback indication in a first feedback communication to the base station.

The communications manager 615 may also receive, from a base station, a group-based acknowledgment feedback configuration for at least a first group of downlink transmissions to the UE, receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determine at least a first acknowledgment feedback indication for the downlink control information communication and a first group-based feedback codebook of the first group of downlink transmissions, and transmit the first acknowledgment feedback indication to the base station independently of the first group-based feedback codebook.

The communications manager 615 may also receive, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, transmit the acknowledgment feedback information to the base station, receive, from the base station, at least a first semi-persistent scheduling transmission based on a first semi-persistent scheduling configuration, receive, from the base station, a request for acknowledgment feedback for all configured hybrid automatic repeat request process identifications, and format acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
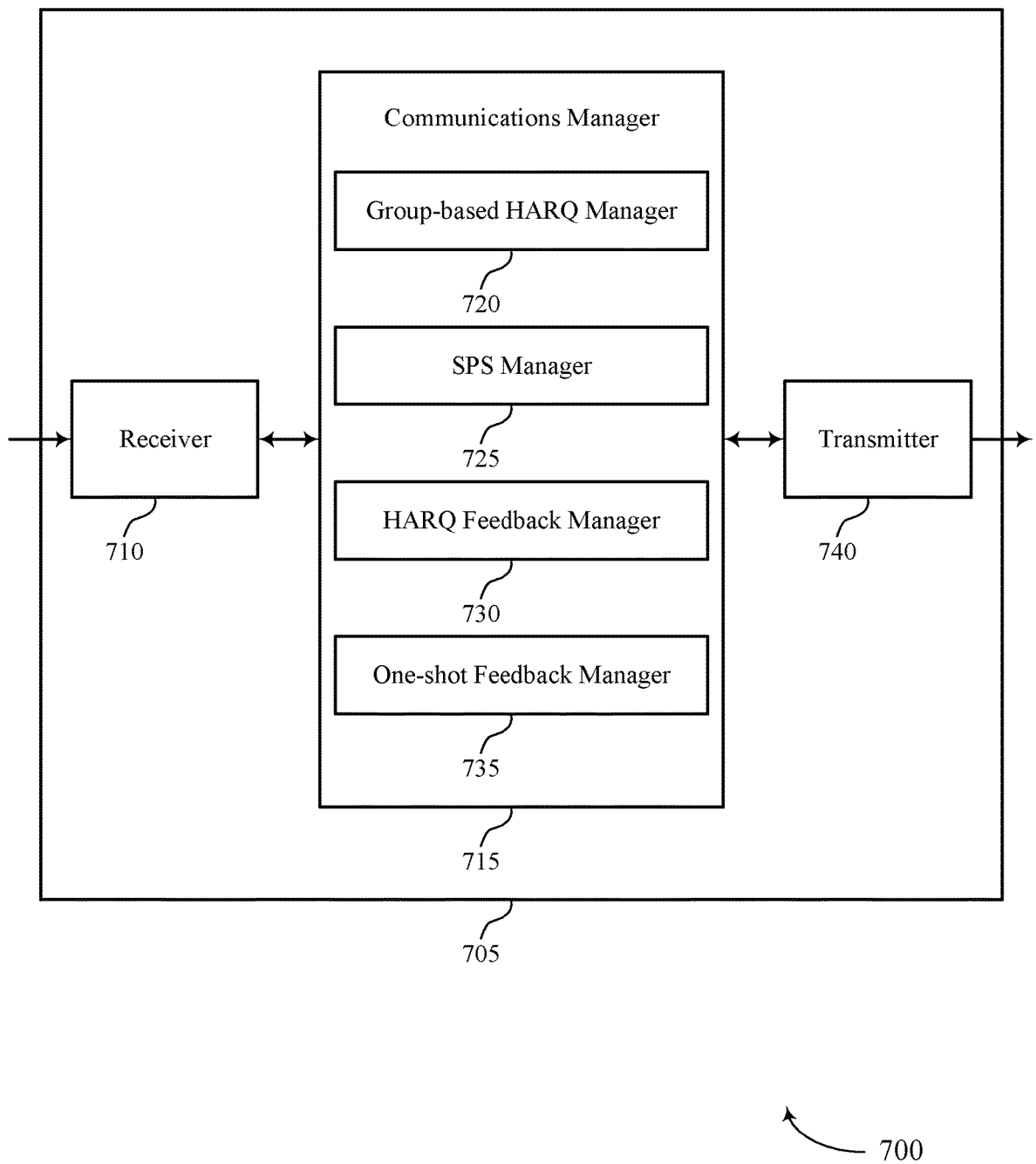

FIG. 7 shows a block diagram 700 of a device 705 that supports group-based acknowledgment feedback for wireless communications in the presence of semi-persistent scheduling in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to group-based acknowledgment feedback for wireless communications in the presence of semi-persistent scheduling, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a group-based HARQ manager 720, a SPS manager 725, a HARQ feedback manager 730, and an one-shot feedback manager 735. The communications manager 715 may be an example of aspects of the communications manager 910 described herein.

In some cases, the group-based HARQ manager 720 may receive, from a base station, a group-based acknowledgment feedback configuration for at least a first group of downlink transmissions to the UE. The SPS manager 725 may receive, from the base station, at least a first semi-persistent scheduling configuration that indicates resources for a set of downlink semi-persistent scheduling transmissions to the UE. The HARQ feedback manager 730 may determine, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions and transmit the first group-based feedback indication and the first acknowledgment feedback indication in a first feedback communication to the base station.

In some cases, the group-based HARQ manager 720 may receive, from a base station, a group-based acknowledgment feedback configuration for at least a first group of downlink transmissions to the UE. The SPS manager 725 may receive, from the base station, at least a first semi-persistent scheduling configuration that indicates resources for a set of downlink semi-persistent scheduling transmissions to the UE. The HARQ feedback manager 730 may determine at least a first acknowledgment feedback indication for a first downlink semi-persistent scheduling transmission and a first group-based feedback codebook of the first group of downlink transmissions and transmit the first acknowledgment feedback indication to the base station independently of the first group-based feedback codebook.

In some cases, the group-based HARQ manager 720 may receive, from a base station, a group-based acknowledgment feedback configuration for at least a first group of downlink transmissions to the UE. The SPS manager 725 may receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE. The HARQ feedback manager 730 may determine, based on one or more of the group-based acknowledgment feedback configuration or the downlink control information communication, that at least a first acknowledgment feedback indication for the downlink control information communication is to be included with a first group-based feedback indication of the first group of downlink transmissions and transmit the first group-based feedback indication and the first acknowledgment feedback indication in a first feedback communication to the base station.

In some cases, the group-based HARQ manager 720 may receive, from a base station, a group-based acknowledgment feedback configuration for at least a first group of downlink transmissions to the UE. The SPS manager 725 may receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE. The HARQ feedback manager 730 may determine at least a first acknowledgment feedback indication for the downlink control information communication and a first group-based feedback codebook of the first group of downlink transmissions and transmit the first acknowledgment feedback indication to the base station independently of the first group-based feedback codebook. The HARQ feedback manager 730 may receive, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission and transmit the acknowledgment feedback information to the base station.

In some cases, the SPS manager 725 may receive, from the base station, at least a first semi-persistent scheduling transmission based on a first semi-persistent scheduling configuration. The one-shot feedback manager 735 may receive, from the base station, a request for acknowledgment feedback for all configured hybrid automatic repeat request process identifications and format acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
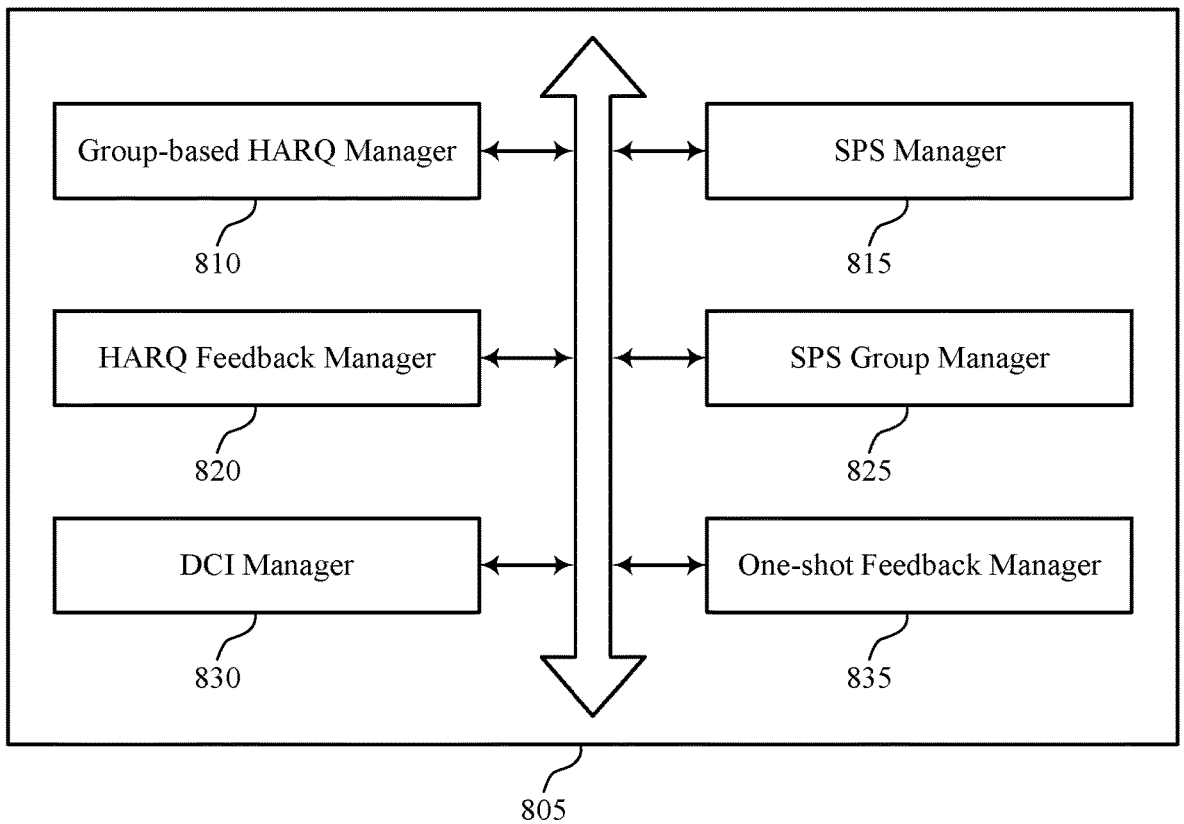
FIG. 8 shows a block diagram of a communications manager that supports group-based acknowledgment feedback for wireless communications in the presence of semi-persistent scheduling in accordance with aspects of the present disclosure.

FIG. 8 shows a block diagram 800 of a communications manager 805 that supports group-based acknowledgment feedback for wireless communications in the presence of semi-persistent scheduling in accordance with aspects of the present disclosure. The communications manager 805 may be an example of aspects of a communications manager 615, a communications manager 715, or a communications manager 910 described herein. The communications manager 805 may include a group-based HARQ manager 810, a SPS manager 815, a HARQ feedback manager 820, a SPS group manager 825, a DCI manager 830, and an one-shot feedback manager 835. Each of these modules may communicate, directly or indirectly, with one another (e.g., via one or more buses).

The group-based HARQ manager 810 may receive, from a base station, a group-based acknowledgment feedback configuration for at least a first group of downlink transmissions to the UE. In some examples, the SPS manager 815 may receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE.

In some examples, the SPS manager 815 may receive, from the base station, at least a first semi-persistent scheduling transmission based on a first semi-persistent scheduling configuration. In some examples, the SPS manager 815 may receive, from the base station, a downlink control information communication that activates the first semi-persistent scheduling configuration, and where the determining is further based on a group indication provided in the downlink control information communication. In some cases, a CRC of the downlink control information transmission is scrambled with a configured scheduling radio network temporary identifier (CS-RNTI) associated with the UE.

The HARQ feedback manager 820 may determine, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions. In some examples, the HARQ feedback manager 820 may transmit the first group-based feedback indication and the first acknowledgment feedback indication in a first feedback communication to the base station.

In some examples, the HARQ feedback manager 820 may determine at least a first acknowledgment feedback indication for a first downlink semi-persistent scheduling transmission and a first group-based feedback codebook of the first group of downlink transmissions. In some examples, the HARQ feedback manager 820 may transmit the first acknowledgment feedback indication to the base station independently of the first group-based feedback codebook.

In some examples, the HARQ feedback manager 820 may determine, based on one or more of the group-based acknowledgment feedback configuration or the downlink control information communication, that at least a first acknowledgment feedback indication for the downlink control information communication is to be included with a first group-based feedback indication of the first group of downlink transmissions.

In some examples, the HARQ feedback manager 820 may transmit the first group-based feedback indication and the first acknowledgment feedback indication in a first feedback communication to the base station. In some examples, the HARQ feedback manager 820 may determine at least a first acknowledgment feedback indication for the downlink control information communication and a first group-based feedback codebook of the first group of downlink transmissions. In some examples, the HARQ feedback manager 820 may transmit the first acknowledgment feedback indication to the base station independently of the first group-based feedback codebook.

In some examples, the HARQ feedback manager 820 may receive, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission. In some examples, the HARQ feedback manager 820 may transmit the acknowledgment feedback information to the base station.

In some examples, the HARQ feedback manager 820 may receive a request to retransmit the first group-based feedback indication from the base station. In some examples, the HARQ feedback manager 820 may retransmit the first group-based feedback indication and the first acknowledgment feedback indication in a second feedback communication to the base station.

In some examples, the HARQ feedback manager 820 may receive, from the base station, a request for a retransmission of the first group-based feedback codebook, and where a retransmission of the first acknowledgment feedback indication for the first downlink semi-persistent scheduling transmission is unable to be requested. In some examples, the HARQ feedback manager 820 may transmit, responsive to the request for the retransmission, a retransmission of the first group-based feedback codebook to the base station, and where the first acknowledgment feedback indication is not included in the retransmission.

In some cases, the request to retransmit is determined by the UE based on a reset indicator value (e.g., a NFI) remaining unchanged from a prior downlink control information transmission associated with the first group-based feedback indication, and where the retransmitting includes one or more additional feedback indications associated with one or more additional transmissions of the first group of downlink transmissions or the semi-persistent scheduling transmissions. In some cases, the second feedback communication further includes feedback information for at least a second acknowledgment feedback indication for a second downlink semi-persistent scheduling transmission that is received subsequent to the first downlink semi-persistent scheduling transmission. In some cases, the first acknowledgment feedback indication and the second acknowledgment feedback indication are appended feedback to a feedback codebook of the first group-based feedback indication. In some cases, the first acknowledgment feedback indication and the second acknowledgment feedback indication are ordered in the appended feedback according to an order of reception of the first downlink semi-persistent scheduling transmission and the second downlink semi-persistent scheduling transmission.

In some cases, the first acknowledgment feedback indication and the second acknowledgment feedback indication are ordered in the appended feedback according to hybrid acknowledgment repeat request (HARQ) process identification values associated with each of the first downlink semi-persistent scheduling transmission and the second downlink semi-persistent scheduling transmission. In some cases, the second acknowledgment feedback indication is appended to an end of the first group-based feedback indication and the first acknowledgment feedback indication. In some cases, the first feedback communication to the base station includes feedback information for two or more downlink transmission groups, and where the first acknowledgment feedback indication is included with the feedback information for the two or more downlink transmission groups.

In some cases, the first acknowledgment feedback indication is appended to the first group-based feedback indication. In some cases, the first acknowledgment feedback indication is appended to the feedback information for two or more downlink transmission groups.

The one-shot feedback manager 835 may receive, from the base station, a request for acknowledgment feedback for all configured hybrid automatic repeat request process identifications. In some examples, the one-shot feedback manager 835 may format acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission.

In some cases, the predetermined new data indicator value is provided for an initial semi-persistent scheduling transmission of the first semi-persistent scheduling configuration. In some cases, the predetermined new data indicator value is provided for the first semi-persistent scheduling transmission when a downlink control information transmission that scheduled the first semi-persistent scheduling transmission indicates that the first semi-persistent scheduling transmission is a retransmission of a prior semi-persistent scheduling transmission.

The SPS group manager 825 may receive, from the base station, a downlink control information communication that schedules a physical downlink shared channel transmission of the first group of downlink transmissions, and where the determining is further based on a group indication provided in the downlink control information communication.

In some cases, the first semi-persistent scheduling configuration further includes a group indication that associated acknowledgment feedback is to be transmitted with the first group-based feedback indication. In some cases, each of the set of downlink semi-persistent scheduling transmissions to the UE according to the first semi-persistent scheduling configuration are associated with a same group-based acknowledgment feedback configuration. In some cases, the downlink control information communication is a latest downlink control information communication received prior to the first downlink semi-persistent scheduling transmission or a next subsequent downlink control information communication received after the first downlink semi-persistent scheduling transmission. In some cases, the determining is further based on a group indication of a regular physical downlink transmission received prior to or after the first downlink semi-persistent scheduling transmission. In some cases, a default transmission group is used for the first acknowledgment feedback indication for the first downlink semi-persistent scheduling transmission when the regular physical downlink transmission received is not associated with the same feedback timing as the first downlink semi-persistent scheduling transmission.

The DCI manager 830 may receive and process DCI from a base station. In some cases, the downlink control information communication indicates that the first acknowledgment feedback indication is to be provided with group-based feedback of the first group of downlink transmissions. In some cases, the first semi-persistent scheduling configuration indicates that the first acknowledgment feedback indication is to be provided with group-based feedback of the first group of downlink transmissions. In some cases, the downlink control information communication further includes a downlink assignment index value that indicates that the first acknowledgment feedback indication is to be provided in a same uplink transmission as the first group-based feedback indication.

Figure 9:
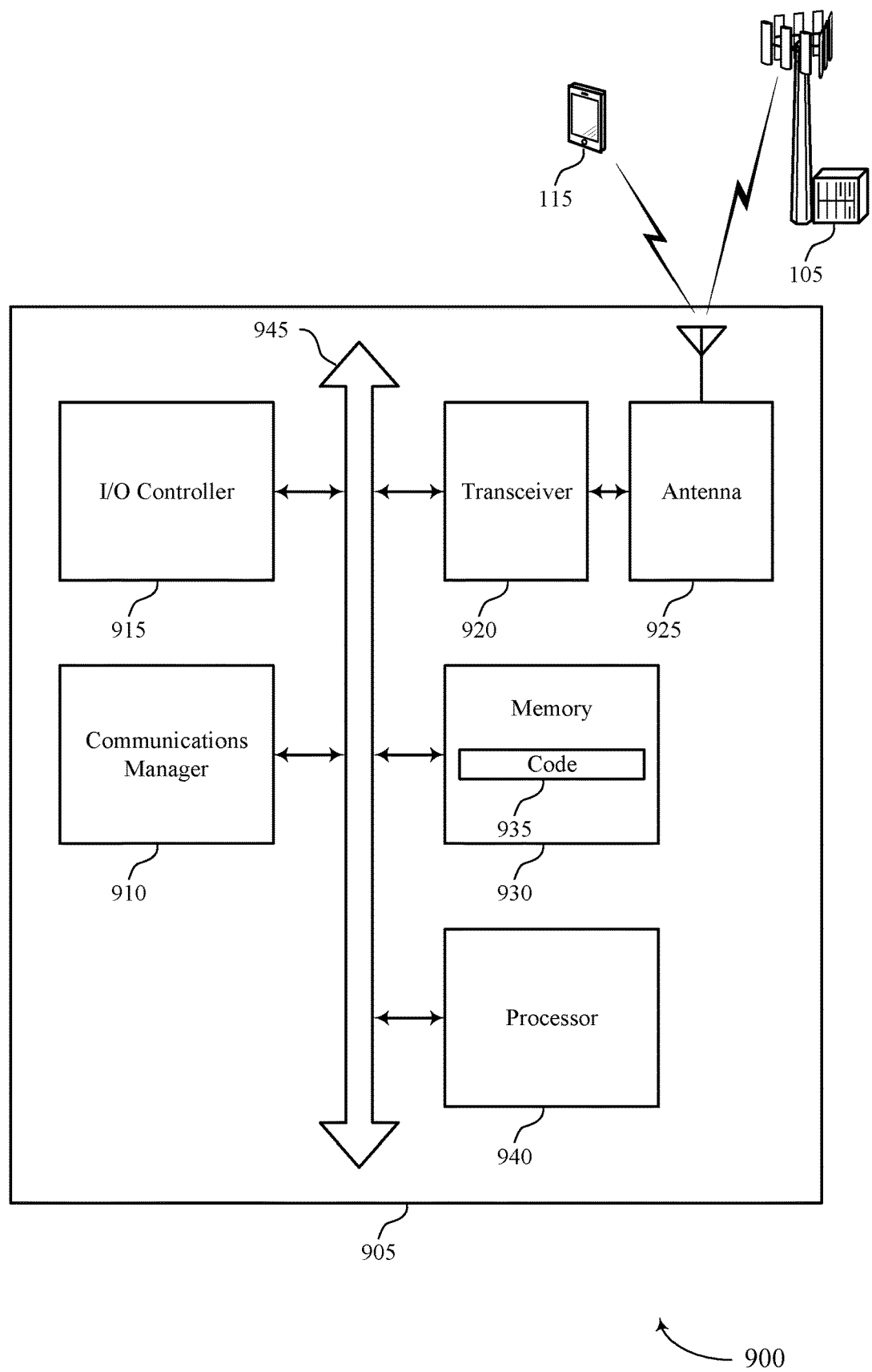
FIG. 9 shows a diagram of a system including a device that supports group-based acknowledgment feedback for wireless communications in the presence of semi-persistent scheduling in accordance with aspects of the present disclosure.

FIG. 9 shows a diagram of a system 900 including a device 905 that supports group-based acknowledgment feedback for wireless communications in the presence of semi-persistent scheduling in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a group-based acknowledgment feedback configuration for at least a first group of downlink transmissions to the UE, receive, from the base station, at least a first semi-persistent scheduling configuration that indicates resources for a set of downlink semi-persistent scheduling transmissions to the UE, determine, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions, and transmit the first group-based feedback indication and the first acknowledgment feedback indication in a first feedback communication to the base station.

The communications manager 910 may also receive, from a base station, a group-based acknowledgment feedback configuration for at least a first group of downlink transmissions to the UE, receive, from the base station, at least a first semi-persistent scheduling configuration that indicates resources for a set of downlink semi-persistent scheduling transmissions to the UE, determine at least a first acknowledgment feedback indication for a first downlink semi-persistent scheduling transmission and a first group-based feedback codebook of the first group of downlink transmissions, and transmit the first acknowledgment feedback indication to the base station independently of the first group-based feedback codebook.

The communications manager 910 may also receive, from a base station, a group-based acknowledgment feedback configuration for at least a first group of downlink transmissions to the UE, receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determine, based on one or more of the group-based acknowledgment feedback configuration or the downlink control information communication, that at least a first acknowledgment feedback indication for the downlink control information communication is to be included with a first group-based feedback indication of the first group of downlink transmissions, and transmit the first group-based feedback indication and the first acknowledgment feedback indication in a first feedback communication to the base station.

The communications manager 910 may also receive, from a base station, a group-based acknowledgment feedback configuration for at least a first group of downlink transmissions to the UE, receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE, determine at least a first acknowledgment feedback indication for the downlink control information communication and a first group-based feedback codebook of the first group of downlink transmissions, and transmit the first acknowledgment feedback indication to the base station independently of the first group-based feedback codebook.

The communications manager 910 may also receive, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, transmit the acknowledgment feedback information to the base station, receive, from the base station, at least a first semi-persistent scheduling transmission based on a first semi-persistent scheduling configuration, receive, from the base station, a request for acknowledgment feedback for all configured hybrid automatic repeat request process identifications, and format acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting group-based acknowledgment feedback for wireless communications in the presence of semi-persistent scheduling).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
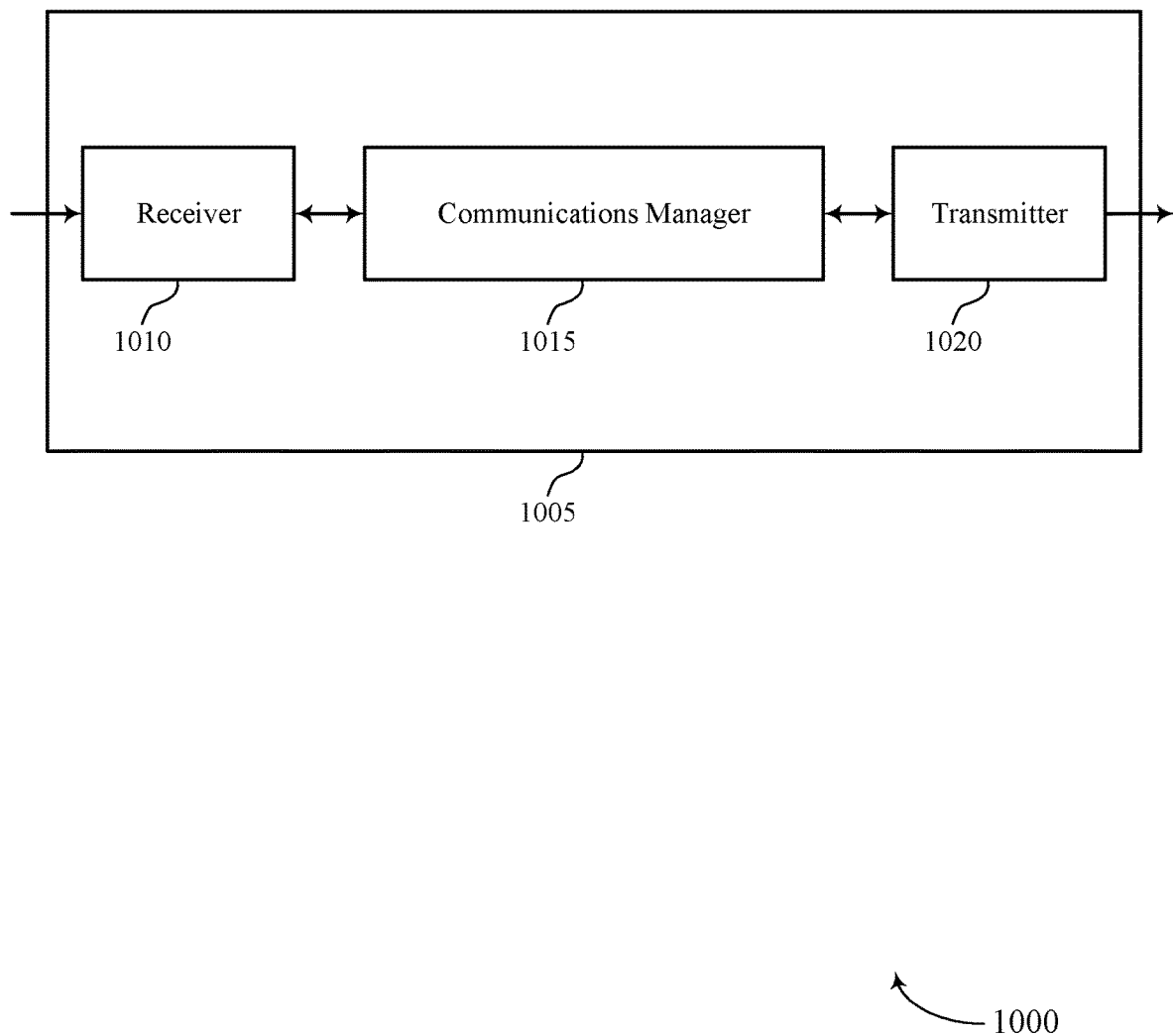
FIGS. 10 and 11 show block diagrams of devices that support group-based acknowledgment feedback for wireless communications in the presence of semi-persistent scheduling in accordance with aspects of the present disclosure.

FIG. 10 shows a block diagram 1000 of a device 1005 that supports group-based acknowledgment feedback for wireless communications in the presence of semi-persistent scheduling in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to group-based acknowledgment feedback for wireless communications in the presence of semi-persistent scheduling, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, transmit, to the UE, a first semi-persistent scheduling transmission based on a first semi-persistent scheduling configuration, where the first semi-persistent scheduling transmission has an associated first new data indicator value and first hybrid acknowledgment repeat request process identification, and transmit, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
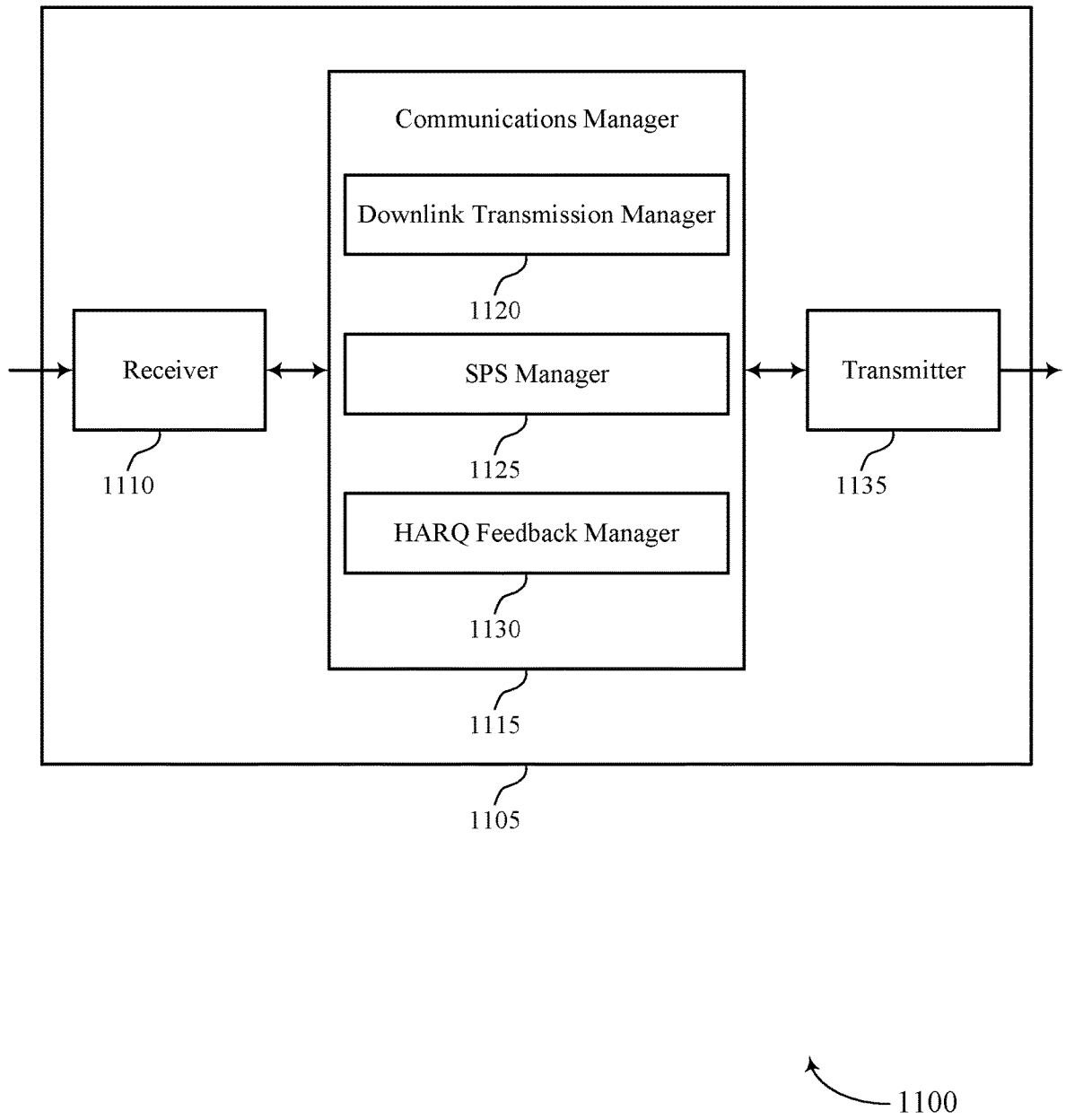

FIG. 11 shows a block diagram 1100 of a device 1105 that supports group-based acknowledgment feedback for wireless communications in the presence of semi-persistent scheduling in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to group-based acknowledgment feedback for wireless communications in the presence of semi-persistent scheduling, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a downlink transmission manager 1120, a SPS manager 1125, and a HARQ feedback manager 1130. The communications manager 1115 may be an example of aspects of the communications manager 1310 described herein.

The downlink transmission manager 1120 may transmit, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission.

The SPS manager 1125 may transmit, to the UE, a first semi-persistent scheduling transmission based on a first semi-persistent scheduling configuration, where the first semi-persistent scheduling transmission has an associated first new data indicator value and first hybrid acknowledgment repeat request process identification.

The HARQ feedback manager 1130 may transmit, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
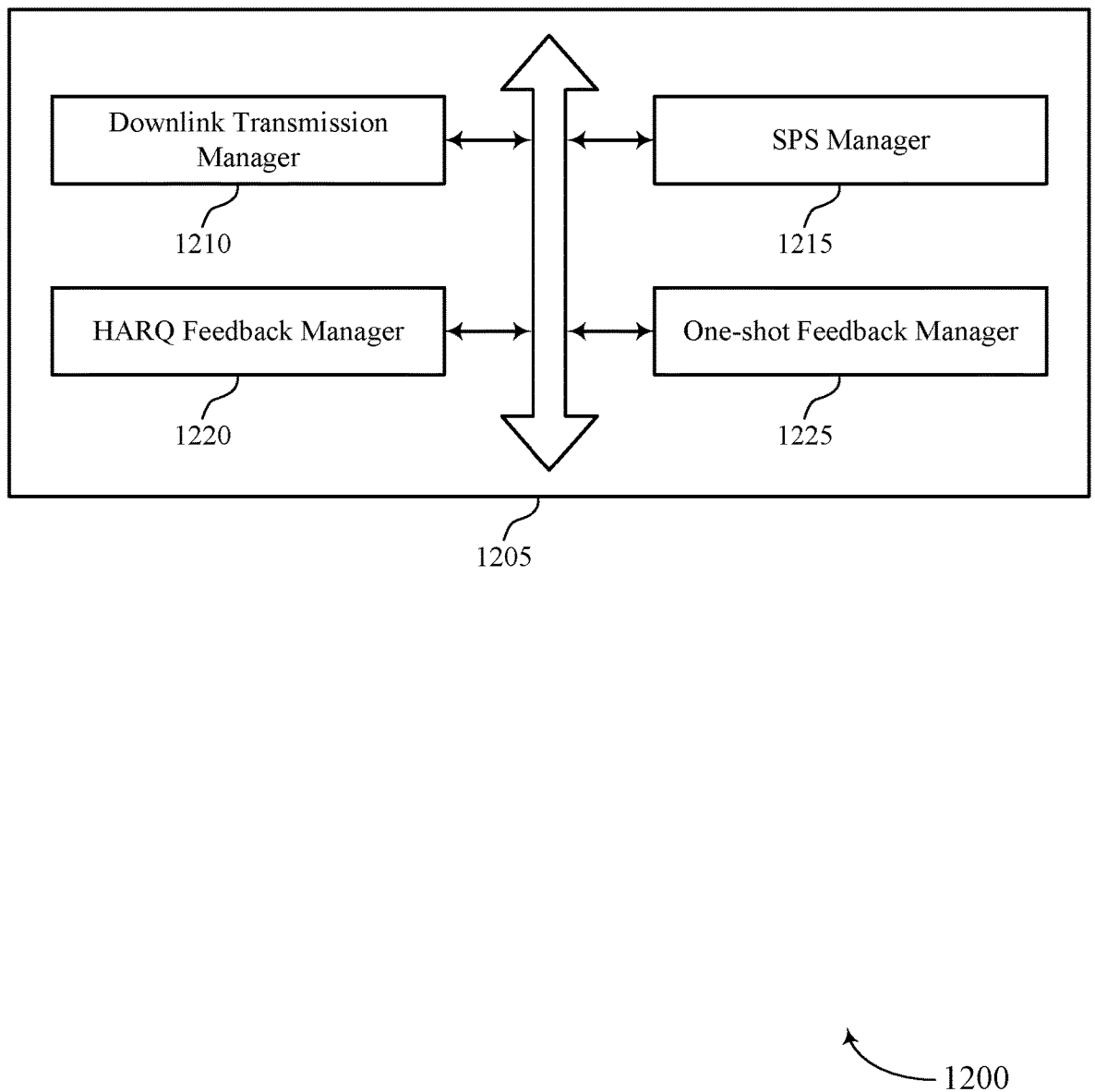
FIG. 12 shows a block diagram of a communications manager that supports group-based acknowledgment feedback for wireless communications in the presence of semi-persistent scheduling in accordance with aspects of the present disclosure.

FIG. 12 shows a block diagram 1200 of a communications manager 1205 that supports group-based acknowledgment feedback for wireless communications in the presence of semi-persistent scheduling in accordance with aspects of the present disclosure. The communications manager 1205 may be an example of aspects of a communications manager 1015, a communications manager 1115, or a communications manager 1310 described herein. The communications manager 1205 may include a downlink transmission manager 1210, a SPS manager 1215, a HARQ feedback manager 1220, and an one-shot feedback manager 1225. Each of these modules may communicate, directly or indirectly, with one another (e.g., via one or more buses).

The downlink transmission manager 1210 may transmit, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission. In some cases, a CRC of the downlink control information transmission is scrambled with a cell radio network temporary identifier (C-RNTI) associated with the UE.

The SPS manager 1215 may transmit, to the UE, a first semi-persistent scheduling transmission based on a first semi-persistent scheduling configuration, where the first semi-persistent scheduling transmission has an associated first new data indicator value and first hybrid acknowledgment repeat request process identification. In some cases, the first semi-persistent scheduling transmission is an initial semi-persistent scheduling transmission or a retransmission of a prior semi-persistent scheduling transmission.

The HARQ feedback manager 1220 may transmit, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value. In some cases, the predetermined value of the first new data indicator value is provided by the base station in an initial downlink control information communication after the first semi-persistent scheduling transmission that uses a same hybrid acknowledgment repeat request (HARQ) process identification.

The one-shot feedback manager 1225 may receive feedback from the UE for at least the first semi-persistent scheduling transmission and a downlink transmission scheduled with the initial downlink control information communication based on the first new data indicator value received from the UE after the initial downlink control information communication.

Figure 13:
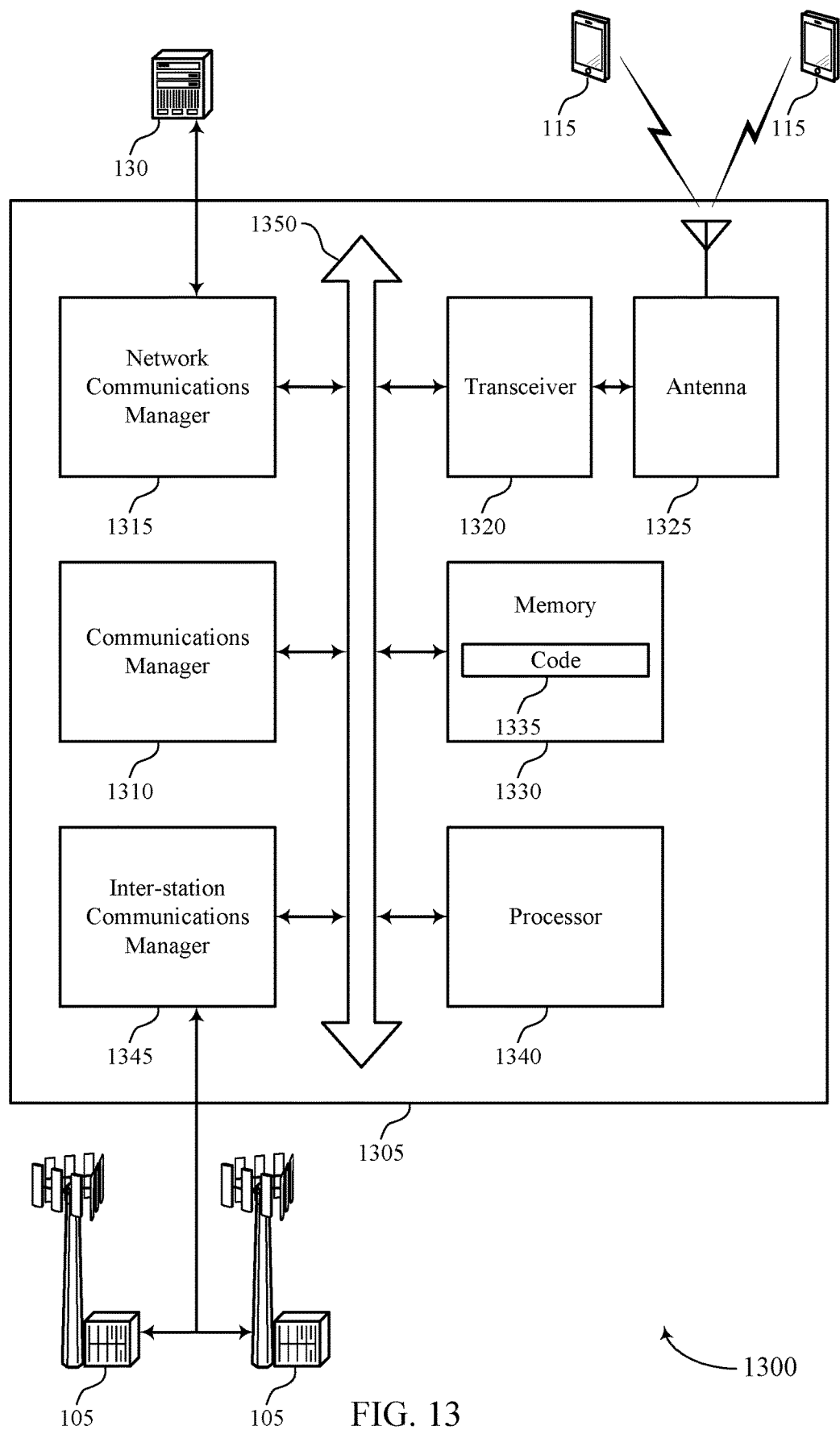
FIG. 13 shows a diagram of a system including a device that supports group-based acknowledgment feedback for wireless communications in the presence of semi-persistent scheduling in accordance with aspects of the present disclosure.

FIG. 13 shows a diagram of a system 1300 including a device 1305 that supports group-based acknowledgment feedback for wireless communications in the presence of semi-persistent scheduling in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission, transmit, to the UE, a first semi-persistent scheduling transmission based on a first semi-persistent scheduling configuration, where the first semi-persistent scheduling transmission has an associated first new data indicator value and first hybrid acknowledgment repeat request process identification, and transmit, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting group-based acknowledgment feedback for wireless communications in the presence of semi-persistent scheduling).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
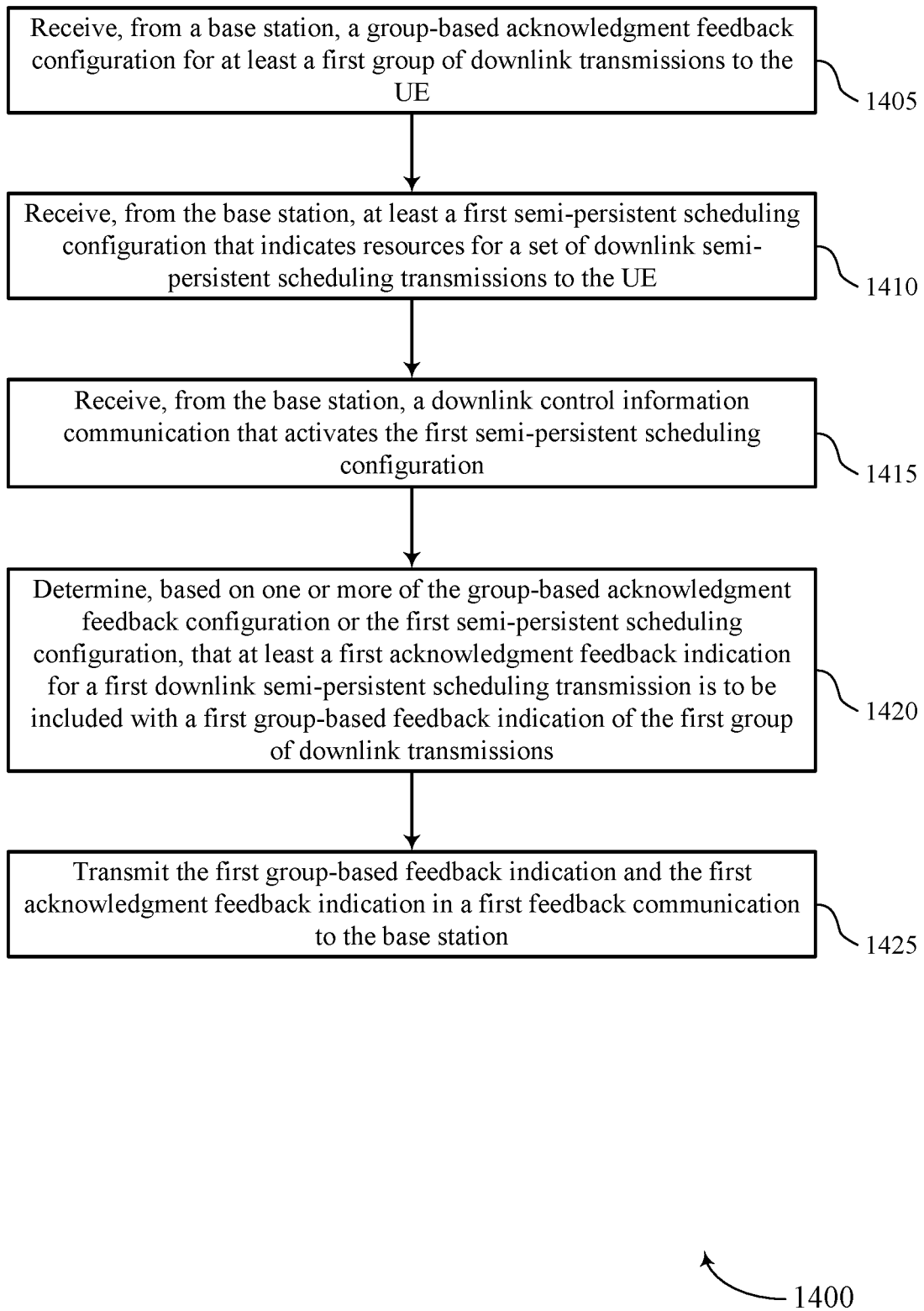
FIGS. 14 through 20 show flowcharts illustrating methods that support group-based acknowledgment feedback for wireless communications in the presence of semi-persistent scheduling in accordance with aspects of the present disclosure.

FIG. 14 shows a flowchart illustrating a method 1400 that supports group-based acknowledgment feedback for wireless communications in the presence of semi-persistent scheduling in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a group-based acknowledgment feedback configuration for at least a first group of downlink transmissions to the UE. The operations of 1405 may be performed according to the methods described herein. In some examples, aspects of the operations of 1405 may be performed by a group-based HARQ manager as described with reference to FIGS. 6 through 9.

At 1410, the UE may receive, from the base station, at least a first semi-persistent scheduling configuration that indicates resources for a set of downlink semi-persistent scheduling transmissions to the UE. The operations of 1410 may be performed according to the methods described herein. In some examples, aspects of the operations of 1410 may be performed by a SPS manager as described with reference to FIGS. 6 through 9.

At 1415, the UE may receive, from the base station, a downlink control information communication that activates the first semi-persistent scheduling configuration. The operations of 1415 may be performed according to the methods described herein. In some examples, aspects of the operations of 1415 may be performed by a SPS manager as described with reference to FIGS. 6 through 9.

At 1420, the UE may determine, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions. The operations of 1420 may be performed according to the methods described herein. In some examples, aspects of the operations of 1420 may be performed by a HARQ feedback manager as described with reference to FIGS. 6 through 9. In some cases, the determination may be further based on a group indication provided in the downlink control information communication.

At 1425, the UE may transmit the first group-based feedback indication and the first acknowledgment feedback indication in a first feedback communication to the base station. The operations of 1425 may be performed according to the methods described herein. In some examples, aspects of the operations of 1425 may be performed by a HARQ feedback manager as described with reference to FIGS. 6 through 9.

Figure 15:
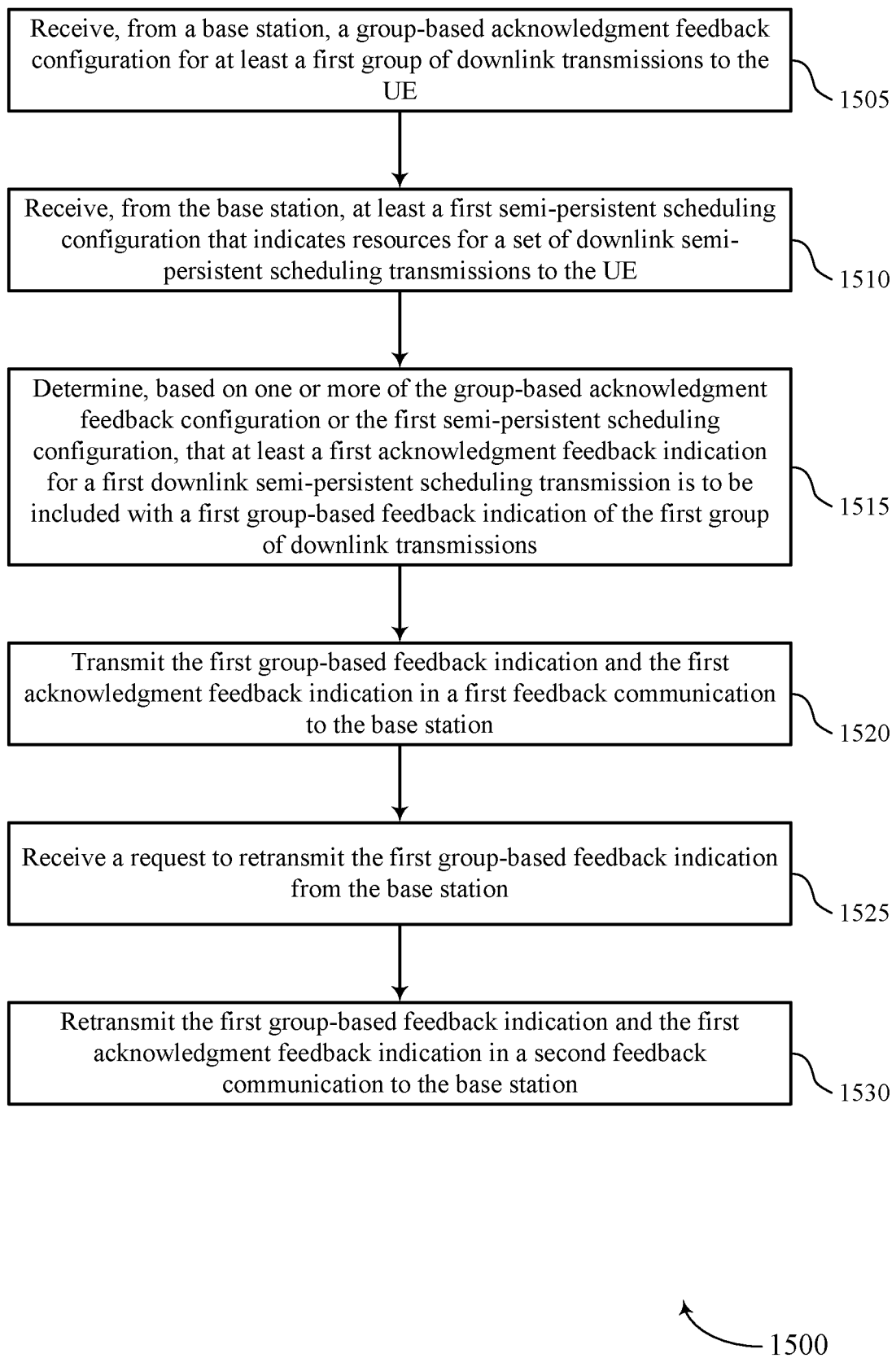

FIG. 15 shows a flowchart illustrating a method 1500 that supports group-based acknowledgment feedback for wireless communications in the presence of semi-persistent scheduling in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a group-based acknowledgment feedback configuration for at least a first group of downlink transmissions to the UE. The operations of 1505 may be performed according to the methods described herein. In some examples, aspects of the operations of 1505 may be performed by a group-based HARQ manager as described with reference to FIGS. 6 through 9.

At 1510, the UE may receive, from the base station, at least a first semi-persistent scheduling configuration that indicates resources for a set of downlink semi-persistent scheduling transmissions to the UE. The operations of 1510 may be performed according to the methods described herein. In some examples, aspects of the operations of 1510 may be performed by a SPS manager as described with reference to FIGS. 6 through 9.

At 1515, the UE may determine, based on one or more of the group-based acknowledgment feedback configuration or the first semi-persistent scheduling configuration, that at least a first acknowledgment feedback indication for a first downlink semi-persistent scheduling transmission is to be included with a first group-based feedback indication of the first group of downlink transmissions. The operations of 1515 may be performed according to the methods described herein. In some examples, aspects of the operations of 1515 may be performed by a HARQ feedback manager as described with reference to FIGS. 6 through 9.

At 1520, the UE may transmit the first group-based feedback indication and the first acknowledgment feedback indication in a first feedback communication to the base station. The operations of 1520 may be performed according to the methods described herein. In some examples, aspects of the operations of 1520 may be performed by a HARQ feedback manager as described with reference to FIGS. 6 through 9.

At 1525, the UE may receive a request to retransmit the first group-based feedback indication from the base station. The operations of 1525 may be performed according to the methods described herein. In some examples, aspects of the operations of 1525 may be performed by a HARQ feedback manager as described with reference to FIGS. 6 through 9. In some cases, the request to retransmit is determined by the UE based on a reset indicator value (e.g., a NFI) remaining unchanged from a prior downlink control information transmission associated with the first group-based feedback indication, and where the retransmitting includes one or more additional feedback indications associated with one or more additional transmissions of the first group of downlink transmissions or the semi-persistent scheduling transmissions.

At 1530, the UE may retransmit the first group-based feedback indication and the first acknowledgment feedback indication in a second feedback communication to the base station. The operations of 1530 may be performed according to the methods described herein. In some examples, aspects of the operations of 1530 may be performed by a HARQ feedback manager as described with reference to FIGS. 6 through 9. In some cases, the second feedback communication further includes feedback information for at least a second acknowledgment feedback indication for a second downlink semi-persistent scheduling transmission that is received subsequent to the first downlink semi-persistent scheduling transmission.

Figure 16:
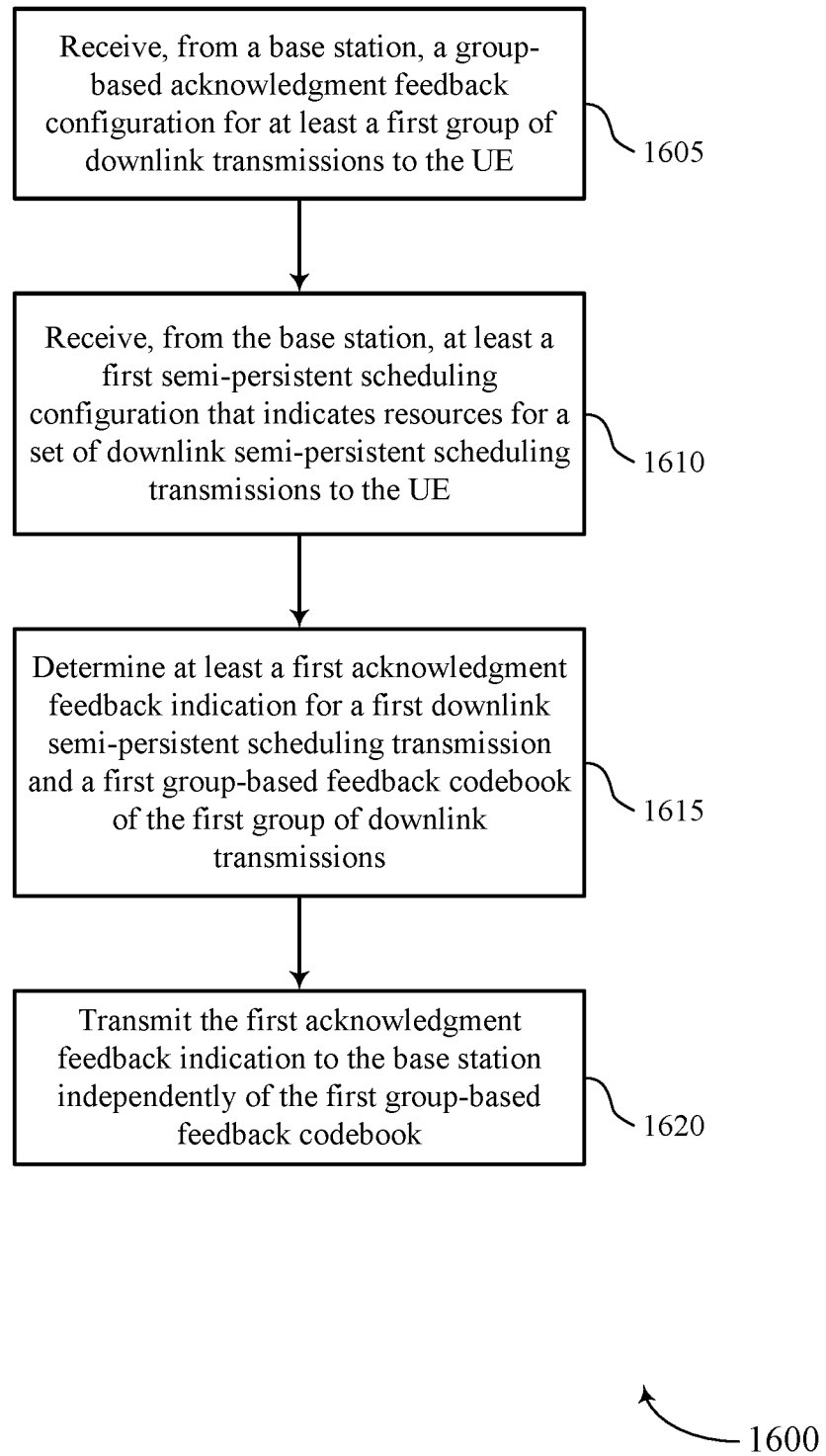

FIG. 16 shows a flowchart illustrating a method 1600 that supports group-based acknowledgment feedback for wireless communications in the presence of semi-persistent scheduling in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a group-based acknowledgment feedback configuration for at least a first group of downlink transmissions to the UE. The operations of 1605 may be performed according to the methods described herein. In some examples, aspects of the operations of 1605 may be performed by a group-based HARQ manager as described with reference to FIGS. 6 through 9.

At 1610, the UE may receive, from the base station, at least a first semi-persistent scheduling configuration that indicates resources for a set of downlink semi-persistent scheduling transmissions to the UE. The operations of 1610 may be performed according to the methods described herein. In some examples, aspects of the operations of 1610 may be performed by a SPS manager as described with reference to FIGS. 6 through 9.

At 1615, the UE may determine at least a first acknowledgment feedback indication for a first downlink semi-persistent scheduling transmission and a first group-based feedback codebook of the first group of downlink transmissions. The operations of 1615 may be performed according to the methods described herein. In some examples, aspects of the operations of 1615 may be performed by a HARQ feedback manager as described with reference to FIGS. 6 through 9.

At 1620, the UE may transmit the first acknowledgment feedback indication to the base station independently of the first group-based feedback codebook. The operations of 1620 may be performed according to the methods described herein. In some examples, aspects of the operations of 1620 may be performed by a HARQ feedback manager as described with reference to FIGS. 6 through 9.

Figure 17:
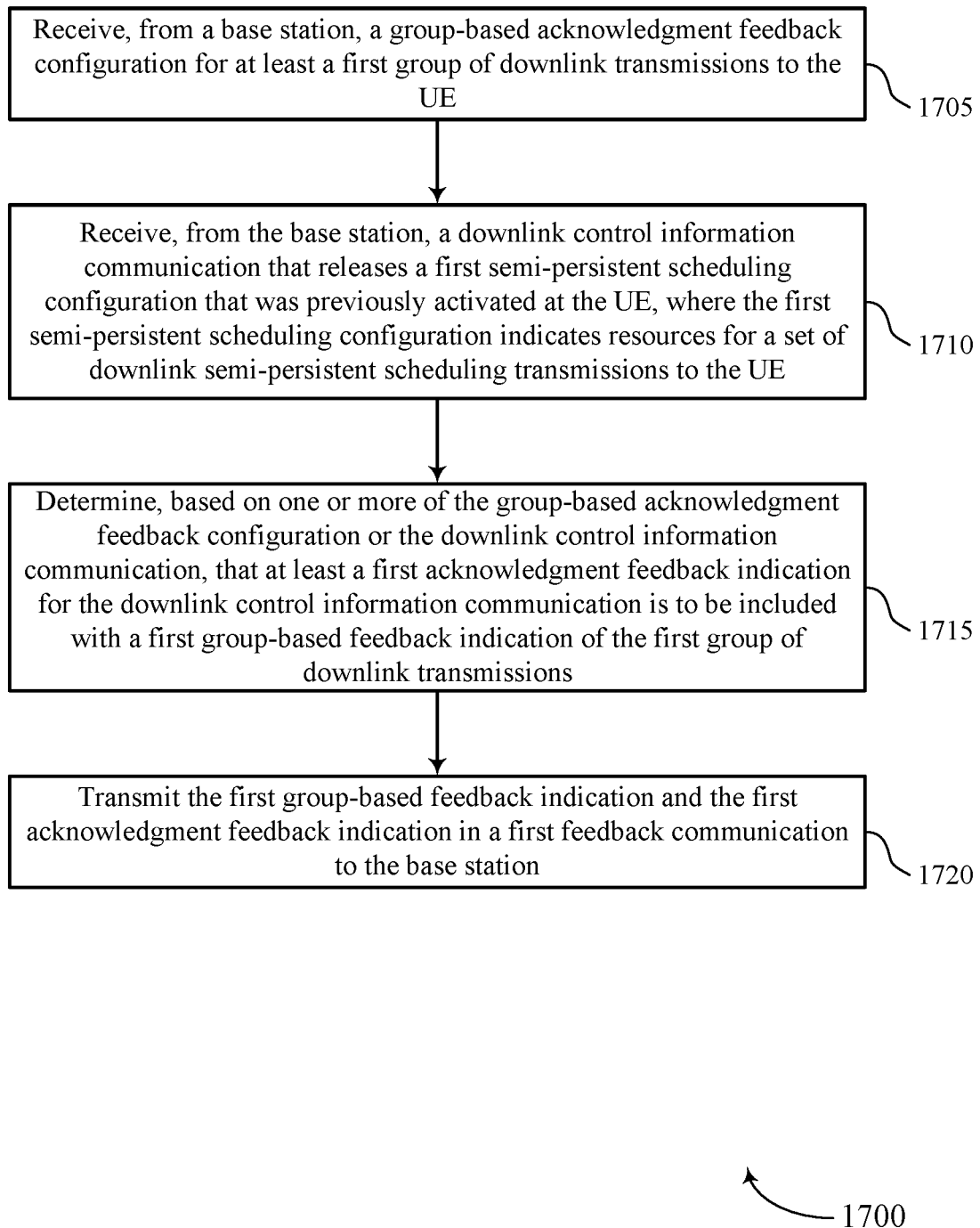

FIG. 17 shows a flowchart illustrating a method 1700 that supports group-based acknowledgment feedback for wireless communications in the presence of semi-persistent scheduling in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a group-based acknowledgment feedback configuration for at least a first group of downlink transmissions to the UE. The operations of 1705 may be performed according to the methods described herein. In some examples, aspects of the operations of 1705 may be performed by a group-based HARQ manager as described with reference to FIGS. 6 through 9.

At 1710, the UE may receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE. The operations of 1710 may be performed according to the methods described herein. In some examples, aspects of the operations of 1710 may be performed by a SPS manager as described with reference to FIGS. 6 through 9.

At 1715, the UE may determine, based on one or more of the group-based acknowledgment feedback configuration or the downlink control information communication, that at least a first acknowledgment feedback indication for the downlink control information communication is to be included with a first group-based feedback indication of the first group of downlink transmissions. The operations of 1715 may be performed according to the methods described herein. In some examples, aspects of the operations of 1715 may be performed by a HARQ feedback manager as described with reference to FIGS. 6 through 9.

At 1720, the UE may transmit the first group-based feedback indication and the first acknowledgment feedback indication in a first feedback communication to the base station. The operations of 1720 may be performed according to the methods described herein.

In some examples, aspects of the operations of 1720 may be performed by a HARQ feedback manager as described with reference to FIGS. 6 through 9.

Figure 18:
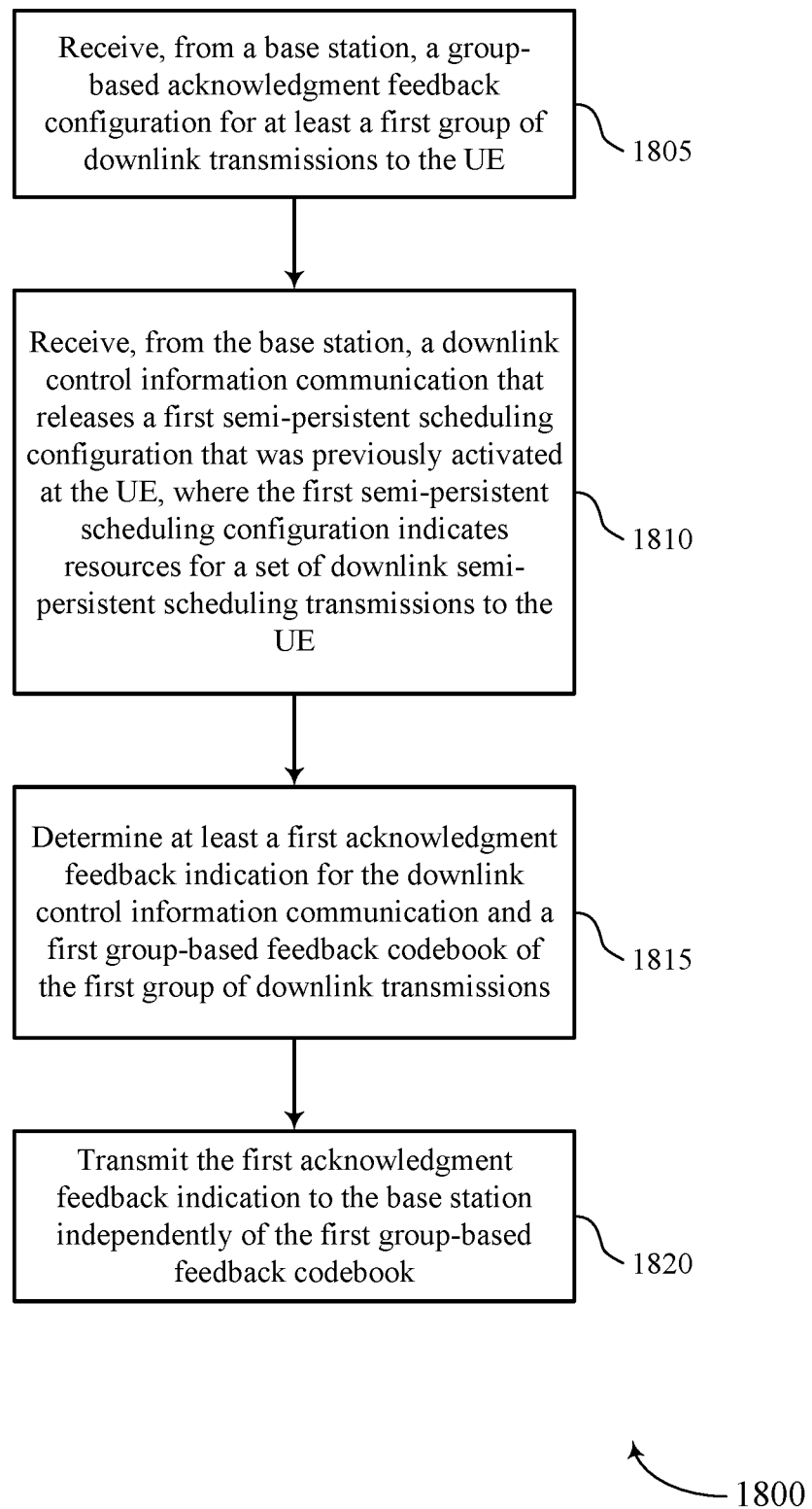

FIG. 18 shows a flowchart illustrating a method 1800 that supports group-based acknowledgment feedback for wireless communications in the presence of semi-persistent scheduling in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a group-based acknowledgment feedback configuration for at least a first group of downlink transmissions to the UE. The operations of 1805 may be performed according to the methods described herein. In some examples, aspects of the operations of 1805 may be performed by a group-based HARQ manager as described with reference to FIGS. 6 through 9.

At 1810, the UE may receive, from the base station, a downlink control information communication that releases a first semi-persistent scheduling configuration that was previously activated at the UE, where the first semi-persistent scheduling configuration indicates resources for a set of downlink semi-persistent scheduling transmissions to the UE. The operations of 1810 may be performed according to the methods described herein. In some examples, aspects of the operations of 1810 may be performed by a SPS manager as described with reference to FIGS. 6 through 9.

At 1815, the UE may determine at least a first acknowledgment feedback indication for the downlink control information communication and a first group-based feedback codebook of the first group of downlink transmissions. The operations of 1815 may be performed according to the methods described herein. In some examples, aspects of the operations of 1815 may be performed by a HARQ feedback manager as described with reference to FIGS. 6 through 9.

At 1820, the UE may transmit the first acknowledgment feedback indication to the base station independently of the first group-based feedback codebook. The operations of 1820 may be performed according to the methods described herein. In some examples, aspects of the operations of 1820 may be performed by a HARQ feedback manager as described with reference to FIGS. 6 through 9.

Figure 19:
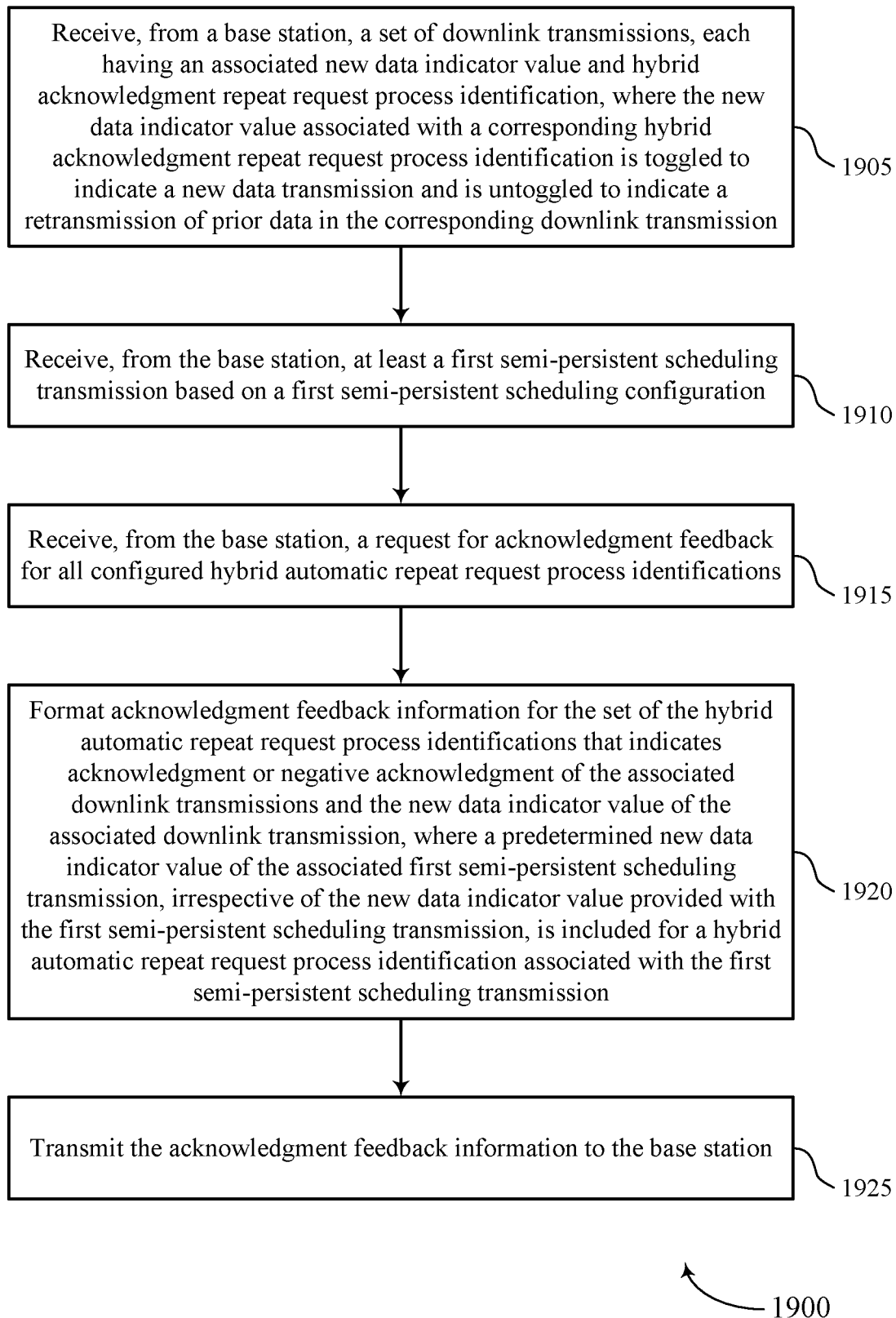

FIG. 19 shows a flowchart illustrating a method 1900 that supports group-based acknowledgment feedback for wireless communications in the presence of semi-persistent scheduling in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a set of downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission. The operations of 1905 may be performed according to the methods described herein. In some examples, aspects of the operations of 1905 may be performed by a HARQ feedback manager as described with reference to FIGS. 6 through 9.

At 1910, the UE may receive, from the base station, at least a first semi-persistent scheduling transmission based on a first semi-persistent scheduling configuration. The operations of 1910 may be performed according to the methods described herein. In some examples, aspects of the operations of 1910 may be performed by a SPS manager as described with reference to FIGS. 6 through 9.

At 1915, the UE may receive, from the base station, a request for acknowledgment feedback for all configured hybrid automatic repeat request process identifications. The operations of 1915 may be performed according to the methods described herein. In some examples, aspects of the operations of 1915 may be performed by an one-shot feedback manager as described with reference to FIGS. 6 through 9.

At 1920, the UE may format acknowledgment feedback information for the set of the hybrid automatic repeat request process identifications that indicates acknowledgment or negative acknowledgment of the associated downlink transmissions and the new data indicator value of the associated downlink transmission, where a predetermined new data indicator value of the associated first semi-persistent scheduling transmission, irrespective of the new data indicator value provided with the first semi-persistent scheduling transmission, is included for a hybrid automatic repeat request process identification associated with the first semi-persistent scheduling transmission. The operations of 1920 may be performed according to the methods described herein. In some examples, aspects of the operations of 1920 may be performed by an one-shot feedback manager as described with reference to FIGS. 6 through 9.

At 1925, the UE may transmit the acknowledgment feedback information to the base station. The operations of 1925 may be performed according to the methods described herein. In some examples, aspects of the operations of 1925 may be performed by a HARQ feedback manager as described with reference to FIGS. 6 through 9.

Figure 20:
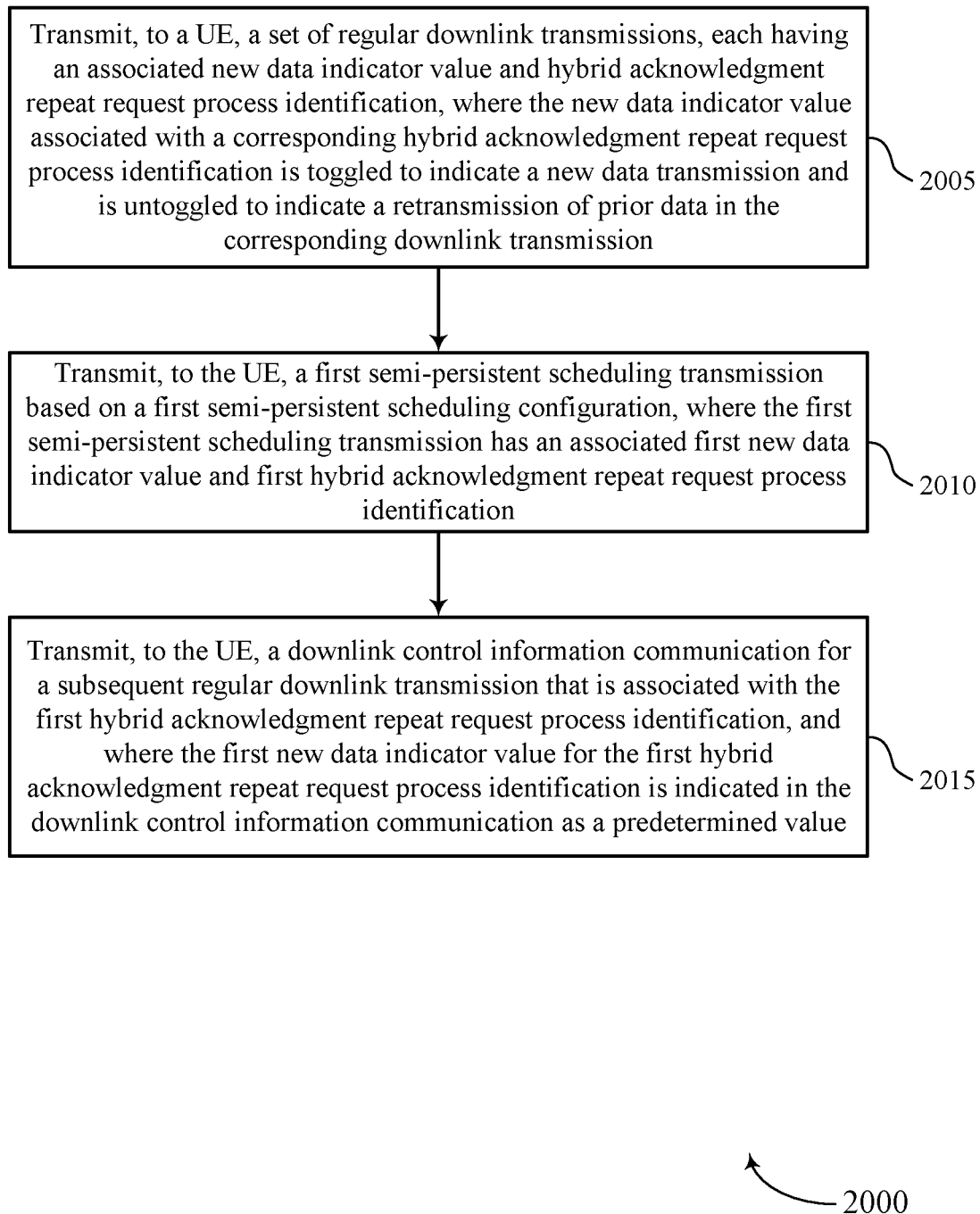

FIG. 20 shows a flowchart illustrating a method 2000 that supports group-based acknowledgment feedback for wireless communications in the presence of semi-persistent scheduling in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a set of regular downlink transmissions, each having an associated new data indicator value and hybrid acknowledgment repeat request process identification, where the new data indicator value associated with a corresponding hybrid acknowledgment repeat request process identification is toggled to indicate a new data transmission and is untoggled to indicate a retransmission of prior data in the corresponding downlink transmission. The operations of 2005 may be performed according to the methods described herein. In some examples, aspects of the operations of 2005 may be performed by a downlink transmission manager as described with reference to FIGS. 10 through 13.

At 2010, the base station may transmit, to the UE, a first semi-persistent scheduling transmission based on a first semi-persistent scheduling configuration, where the first semi-persistent scheduling transmission has an associated first new data indicator value and first hybrid acknowledgment repeat request process identification. The operations of 2010 may be performed according to the methods described herein. In some examples, aspects of the operations of 2010 may be performed by a SPS manager as described with reference to FIGS. 10 through 13.

At 2015, the base station may transmit, to the UE, a downlink control information communication for a subsequent regular downlink transmission that is associated with the first hybrid acknowledgment repeat request process identification, and where the first new data indicator value for the first hybrid acknowledgment repeat request process identification is indicated in the downlink control information communication as a predetermined value. The operations of 2015 may be performed according to the methods described herein. In some examples, aspects of the operations of 2015 may be performed by a HARQ feedback manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a network entity, a group-based acknowledgment feedback configuration for at least a first group of downlink transmissions to the UE;
    receiving, from the network entity, at least a first semi-persistent scheduling configuration that indicates resources for a plurality of downlink semi-persistent scheduling transmissions to the UE;

determining a first group-based feedback codebook of the first group of downlink transmissions;

determining, independently from the first group-based feedback codebook, at least a first acknowledgment feedback indication for a first downlink semi-persistent scheduling transmission;

transmitting the first group-based feedback codebook and the first acknowledgment feedback indication to the network entity; and transmitting, responsive to a request for a retransmission, a retransmission of the first group-based feedback codebook to the network entity, wherein the first acknowledgment feedback indication is excluded from the retransmission.

2. The method of claim 1, further comprising:
receiving, from the network entity, the request for the retransmission of the first group-based feedback codebook, wherein retransmission of the first acknowledgment feedback indication for the first downlink semi-persistent scheduling transmission is unable to be requested.

3. The method of claim 1, wherein the retransmission includes one or more additional feedback indications associated with one or more additional transmissions of the first group of downlink transmissions.

4. The method of claim 1, further comprising:
receiving, from the network entity, a downlink control information communication that releases the first semi-persistent scheduling configuration that was previously activated at the UE.

5. An apparatus for wireless communication at a user equipment (UE), comprising:
a processor,
memory in electronic communication with the processor; and
instructions stored in the memory, wherein the instructions are executable by the processor to:
receive, from a network entity, a group-based acknowledgment feedback configuration for at least a first group of downlink transmissions to the UE;
receive, from the network entity, at least a first semi-persistent scheduling configuration that indicates resources for a plurality of downlink semi-persistent scheduling transmissions to the UE;
determine a first group-based feedback codebook of the first group of downlink transmissions;
determine, independently from the first group-based feedback codebook, at least a first acknowledgment feedback indication for a first downlink semi-persistent scheduling transmission;
transmit the first group-based feedback codebook and the first acknowledgment feedback indication to the network entity; and
transmit, responsive to a request for a retransmission, a retransmission of the first group-based feedback codebook to the network entity, wherein the first acknowledgment feedback indication is excluded from the retransmission.

6. The apparatus of claim 5, further comprising instructions executable by the processor to:
receive, from the network entity, the request for the retransmission of the first group-based feedback codebook, wherein a retransmission of the first acknowledgment feedback indication for the first downlink semi-persistent scheduling transmission is unable to be requested.

7. The apparatus of claim 6, wherein the retransmission includes one or more additional feedback indications associated with one or more additional transmissions of the first group of downlink transmissions.

8. The apparatus of claim 5, further comprising:
receiving, from the network entity, a downlink control information communication that releases the first semi-persistent scheduling configuration that was previously activated at the UE.

9. A method for wireless communication, comprising:
transmitting, to a user equipment (UE), a group-based acknowledgment feedback configuration for at least a first group of downlink transmissions to the UE;
transmitting, to the UE, at least a first semi-persistent scheduling configuration that indicates resources for a plurality of downlink semi-persistent scheduling transmissions to the UE;
receiving, from the UE, a first group-based feedback codebook of the first group of downlink transmissions;
receiving, from the UE, a first acknowledgment feedback indication for a first downlink semi-persistent scheduling transmission separately from the first group-based feedback codebook; and
receiving, responsive to a request for a retransmission, a retransmission of the first group-based feedback codebook, wherein the first acknowledgment feedback indication is excluded from the retransmission.

10. The method of claim 9, further comprising:
transmitting, to the UE, the request for the retransmission of the first group-based feedback codebook, wherein a retransmission of the first acknowledgment feedback indication for the first downlink semi-persistent scheduling transmission is unable to be requested.

11. The method of claim 9, wherein the retransmission includes one or more additional feedback indications associated with one or more additional transmissions of the first group of downlink transmissions.

12. The method of claim 9, further comprising:
transmitting, to the UE, a downlink control information communication that releases the first semi-persistent scheduling configuration that was previously activated at the UE.

13. An apparatus for wireless communication, comprising:
a processor,
memory in electronic communication with the processor; and
instructions stored in the memory, wherein the instructions are executable by the processor to:
transmit, to a user equipment (UE), a group-based acknowledgment feedback configuration for at least a first group of downlink transmissions to the UE;
transmit, to the UE, at least a first semi-persistent scheduling configuration that indicates resources for a plurality of downlink semi-persistent scheduling transmissions to the UE;
receive, from the UE, a first group-based feedback codebook of the first group of downlink transmissions;
receive, from the UE, a first acknowledgment feedback indication for a first downlink semi-persistent scheduling transmission separately from receiving the first group-based feedback codebook; and
receive, responsive to a request for a retransmission, a retransmission of the first group-based feedback codebook, wherein the first acknowledgment feedback indication is excluded from the retransmission.

14. The apparatus of claim 13, further comprising instructions executable by the processor to:
- transmit, to the UE, the request for the retransmission of the first group-based feedback codebook, wherein a retransmission of the first acknowledgment feedback indication for the first downlink semi-persistent scheduling transmission is unable to be requested.

15. The apparatus of claim 13, wherein the retransmission includes one or more additional feedback indications associated with one or more additional transmissions of the first group of downlink transmissions.

16. The apparatus of claim 13, further comprising:
- transmitting, to the UE, a downlink control information communication that releases the first semi-persistent scheduling configuration that was previously activated at the UE.

\* \* \* \* \*